US009967744B2

(12) United States Patent
Kim et al.

(10) Patent No.: US 9,967,744 B2
(45) Date of Patent: May 8, 2018

(54) METHOD FOR PROVIDING PERSONAL ASSISTANT SERVICE AND ELECTRONIC DEVICE THEREOF

(71) Applicant: SAMSUNG ELECTRONICS CO., LTD., Suwon-si, Gyeonggi-do (KR)

(72) Inventors: Young-Kyoo Kim, Seoul (KR); Hyuk Kang, Yongin-si (KR); Kyung-Tae Kim, Hwaseong-si (KR); Jae-Bong Yoo, Seongnam-si (KR)

(73) Assignee: Samsung Electronics Co., Ltd, Suwon-si, Gyeonggi-do (KR)

(*) Notice: Subject to any disclaimer, the term of this patent is extended or adjusted under 35 U.S.C. 154(b) by 0 days. days.

(21) Appl. No.: 14/933,125

(22) Filed: Nov. 5, 2015

(65) Prior Publication Data
US 2016/0174074 A1    Jun. 16, 2016

(30) Foreign Application Priority Data
Dec. 11, 2014    (KR) .................. 10-2014-0178403

(51) Int. Cl.
H04W 12/06    (2009.01)
H04M 3/42    (2006.01)
H04L 29/08    (2006.01)
H04W 4/20    (2018.01)

(52) U.S. Cl.
CPC ............ H04W 12/06 (2013.01); H04L 67/10 (2013.01); H04L 67/22 (2013.01); H04M 3/42204 (2013.01); H04W 4/206 (2013.01)

(58) Field of Classification Search
CPC ...... G06F 3/167; G06F 17/30; G06F 17/3005; H04M 2250/74; H04M 1/72569; H04M 1/2471; H04M 3/493; H04M 3/42204; H04W 4/003; H04W 12/06; H04W 4/18; H04W 4/206; H04L 67/10; H04L 67/22
See application file for complete search history.

(56) References Cited

U.S. PATENT DOCUMENTS

| 2008/0155644 | A1* | 6/2008 | Baranov | H04W 12/10 726/1 |
| 2010/0217582 | A1* | 8/2010 | Waibel | G06F 17/2809 704/7 |
| 2011/0053582 | A1* | 3/2011 | Mueck | H04W 48/14 455/419 |
| 2011/0161478 | A1* | 6/2011 | Formo | H04L 63/105 709/223 |
| 2012/0253788 | A1* | 10/2012 | Heck | G06F 17/279 704/9 |
| 2013/0091551 | A1* | 4/2013 | Rajakarunanayake | H04L 51/32 726/4 |
| 2014/0089417 | A1 | 3/2014 | Van Os et al. | |
| 2014/0365227 | A1* | 12/2014 | Cash | G10L 15/22 704/275 |

(Continued)

Primary Examiner — Daniel Lai
(74) Attorney, Agent, or Firm — Nixon & Vanderhye P.C.

(57) ABSTRACT

A first electronic device is provided. The first electronic device includes, for example: a receiver configured to receive a first signal from a second device; a controller configured to generate a response signal corresponding to the first signal based on mutual information between users of the first electronic device and the second device, or the first signal; and a transmitter configured to transmit the response signal to the second device.

17 Claims, 18 Drawing Sheets

(56) References Cited

U.S. PATENT DOCUMENTS

2015/0046711 A1* 2/2015 Slaby ................... H04L 63/08
    713/170
2015/0348032 A1* 12/2015 Ioveva et al. .......... G06Q 20/40
    705/44

* cited by examiner

METHOD FOR PROVIDING PERSONAL ASSISTANT SERVICE AND ELECTRONIC DEVICE THEREOF

CROSS-REFERENCE TO RELATED APPLICATION

This application is based on and claims priority under 35 U.S.C. § 119 to Korean Patent Application No. 10-2014-0178403 filed in the Korean Intellectual Property Office on Dec. 11, 2014, the disclosure of which is incorporated herein by reference in its entirety.

BACKGROUND

1. Technical Field

The disclosure relates generally to an electronic device, and for example, to a method and apparatus for providing a personal assistant service.

2. Description of Related Art

A related-art personal assistant service may provide information such as contact information or a personal schedule in response to a user's voice command, and may provide a response to a user's query, such as weather or stock prices, as a voice based on contents searched on the web. In addition, the related-art personal assistant service may transmit information which is determined to be desired by a user to the user in advance, based on a user's searching habit. In this case, a response to a user's command or query may be generated based on use information of a terminal owner.

The related-art personal assistant service has a problem that information is provided only to a terminal owner unilaterally. In other words, the service just responds to the command or query of the terminal owner or transmits information which is determined to be desired by the terminal owner in advance, based on the terminal owner's searching habit, and does not provide a response to an owner of another terminal communicating with the owner of the terminal Therefore, there is a need for a method for providing a service not only to the owner of a terminal but also to the owner of another terminal communicating with the owner of the terminal, as a real personal assistant, in order to provide an efficient personal assistant service.

SUMMARY

According to an example, a first electronic device includes: a receiver configured to receive a first signal from a second device; a controller configured to generate a response signal corresponding to the first signal based on mutual information between users of the first electronic device and the second device, or the first signal; and a transmitter configured to transmit the response signal to the second device.

According to another example, a server includes: a receiver configured to receive, from a first electronic device, context awareness information related to the electronic device, mutual information between users of the first electronic device and a second device, and a first signal transmitted by the second device; a controller configured to determine an intention corresponding to the first signal and generate data corresponding to the first signal based on the intention, the context awareness information, and the mutual information; and a transmitter configured to transmit the data to the first electronic device.

According to another example, a first electronic device includes: a transmitter configured to transmit a first signal to a second device; and a receiver configured to receive a first response signal corresponding to the first signal from the second device.

According to another example, a method of operation of a first electronic device includes: receiving a first signal from a second device; generating a response signal corresponding to the first signal based on mutual information between users of the first electronic device and the second device, or the first signal; and transmitting the response signal to the second device.

According to another example, a method of operation of a server includes: receiving, from a first electronic device, context awareness information related to the first electronic device, mutual information between users of the first electronic device and a second device, and a first signal transmitted by the second device; determining an intention corresponding to the first signal and generating data corresponding to the first signal based on the intention, the context awareness information, and the mutual information; and transmitting the data to the first electronic device.

According to another example, a method of operation of a first electronic device includes: transmitting a first signal to a second device; and receiving a first response signal corresponding to the first signal from the second device.

According to the examples, not only a response to an owner of a terminal but also a response to an owner of another terminal which communicates with the terminal are provided, so that a bi-directional personal assistant service can be provided and thus an efficient personal assistant service which is adaptive to an external environment can be provided.

BRIEF DESCRIPTION OF THE DRAWINGS

These and other aspects and advantages will become apparent form the following detailed description taken in conjunction with the accompanying drawings, in which like reference numerals refer to like elements, and wherein.

DETAILED DESCRIPTION

Figure 1:
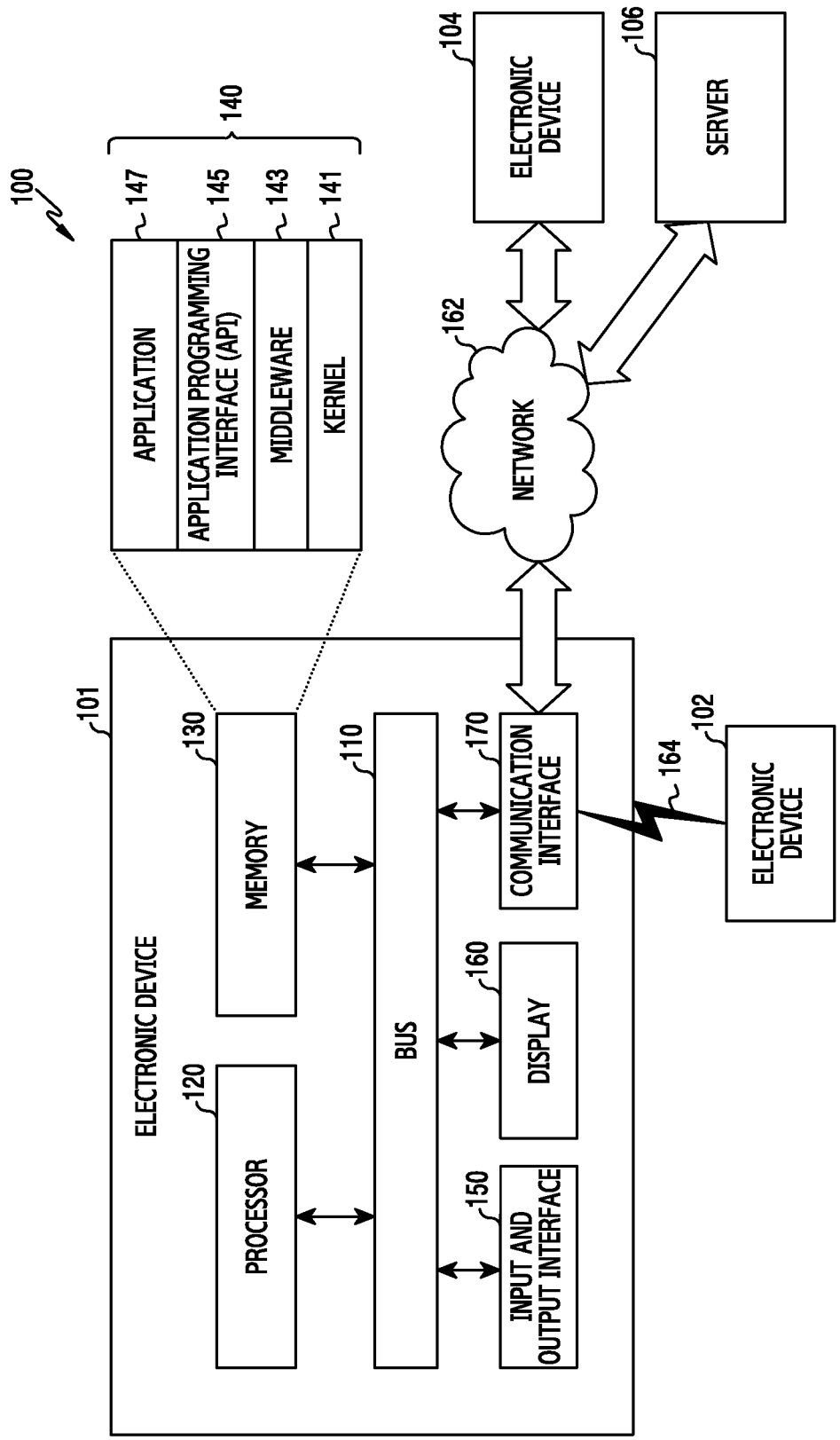
FIG. 1 is a block diagram illustrating an example network environment including an electronic device.

The disclosure is described with reference to the accompanying drawings. The disclosure may be changed and may include various examples, and specific examples are exemplarily described and related detailed descriptions are made in the specification. However, it should be understood that the various examples of the disclosure are not limited to a specific embodied form and include all modifications and/or equivalents or substitutions that fall within the spirit and technical scope of the disclosure. In the drawing, like reference numerals are used for like elements.

Expressions such as "include" or "may include", etc. that may be used in the disclosure indicate existence of a disclosed relevant function, operation, or element, etc., and do not limit additional one or more functions, operations, or elements, etc. Also, it should be understood that terminologies such as "include" or "have", etc. in the disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in the disclosure includes a certain and all combinations of words listed together. For example, "A or B" may include A and may include B, or include both A and B.

In the disclosure, expressions such as "1st", "2nd", "first" or "second", etc. may modify various elements of the disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

Terminology used in the disclosure is used for explaining only a specific example and is not intended to limit the disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the disclosure belongs. It should be understood that generally used terminologies defined by a dictionary have meaning coinciding with meaning on context of a related technology, and unless clearly defined in the disclosure, they are not understood as an ideal or excessively formal meaning.

An electronic device of disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic appcessory, an electronic tattoo, or a smartwatch).

According to certain examples, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, or an electronic frame.

According to certain examples, an electronic device may include at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), an avionics, a security device, or a robot for an industrial use or a home use.

According to certain examples, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the disclosure may be a combination of one or more of the above-described devices. Also, it will be apparent to one skilled in the art that the electronic device examples of the disclosure are not limited to the above-described devices.

An electronic device according to various examples of the disclosure is described with reference to the accompanying drawings. A terminology of a user used in various examples may indicate a person who uses an electronic device or a device (e.g., an artificial intelligence electronic device) that uses the electronic device.

FIG. 1 is a view illustrating a network environment 100 including an electronic device 101 according to various examples. Referring to FIG. 1, the electronic device 101 may include a bus 110, a processor 120, a memory 130, an input/output (I/O) interface 150, a display 160, and a communication interface 170.

The bus 110 may, for example, be a circuit for connecting the above-described elements with each other, and transferring communication (e.g., a control message) between the above-described elements.

The processor 120 may include a central processing unit (CPU), a communication processor (CP), a graphic processing unit (GPU), etc.

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, an application 147, or the like. The each of the programming modules may be configured using a software, a firmware, a hardware, e.g., electronic circuitry, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may, for example, provide an interface for allowing the middleware 143, the API 145, or the application 147 to access an individual element of the electronic device 101 and control or manage the same.

The middleware 143 may, for example, perform a mediation role so that the API 145 or the application 147 may communicate with the kernel 141 to give and take data. Also, in connection with task requests received from the applications 147, the middleware 143 may perform a control function (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

According to various examples, the application 147 may include a Short Message Service/Multimedia Messaging Service SMS/MMS application, an e-mail application, a calendar application, alarm application, a health care application (e.g., an application for measuring quantity of motion or blood sugar, etc.), or an environment information application (e.g., an application providing atmospheric pressure, humidity or temperature information, etc.). Additionally or alternatively, the application 147 may be an application related to information exchange between the electronic device 101 and an external electronic device (e.g., the electronic device 102 or 104). The application related to the information exchange may include, for example, a notification relay application for transferring specific information to the external electronic device or a device management application for managing the external electronic device.

For example, the notification relay application may include a function for transferring notification information generated from a different application (e.g., an SMS/MMS application, an e-mail application, a health care application, or an environment information application) of the electronic device 101 to an external electronic device (e.g., the electronic device 102 or 104). Additionally or alternatively, the notification relay application may, for example, receive notification information from an external electronic device (e.g., the electronic device 102 or 104) and provide the same to a user. The device management application may manage (e.g., install, delete, or update) a function (e.g., turn-on/turn-off of an external electronic device itself (or some constituent part) or luminance (or resolution) control of a display) of an external electronic device (e.g., the electronic device 102 or 104) communicating with the electronic device 101 and an application operating in the external electronic device or a service (e.g., a communication service or a message service) provided by the external electronic device.

According to various examples, the application 147 may include a designated application depending on an attribute (e.g., a kind of an electronic device) of the external electronic device (e.g., the electronic device 104). For example, in the case where the external electronic device is an MP3 player, the application 147 may include an application related to music reproduction. Similarly, in the case where the external electronic device is a mobile medical health care device, the application 147 may include an application related to health care. According to an example, the application 147 may include at least one of an application designated in the electronic device 101 and an application received from the external electronic device (e.g., the server 106, the electronic device 102 or 104).

The I/O interface 150 may, for example, transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a Liquid Crystal Display (LCD), a Light Emitting Diode (LED) display, an Organic Light Emitting Diode (OLED) display, a Micro Electro Mechanical System (MEMS) display, an electronic paper display, or the like. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

According to an example, the display 160 may display a contact list based on a priority of each of the contacts included in the contact list. For example, the priority of the contacts may be determined based on at least one of a transmission history, a transmission frequency, a transmission speed, a charging policy, intimacy, a counterpart's location, a schedule, or application preference.

According to an example, the display 160 may display a service list based on a priority of each of the applications or services included in the service list. For example, the priority of the applications or services may be determined based on configuration information of a service provider, configuration information of a manufacturer, contact information, application preference, user preference, a use time point, a distance from a target to share contents, a transmission history, and a charging policy.

The communication interface 170 may provide communication between the electronic device 101 and an external device (for example, the electronic device 104 or the server 106). For example, the communication interface 170 may be connected to a network 162 through wireless communication or wired communication, and may communicate with an external device.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol.

The wireless communication may include at least one of, for example, WiFi, Bluetooth, BLE, Zigbee, Infrared (IR) communication, and ultrasonic communication as a short-range communication protocol 164.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

The electronic devices 102 and 104 may, for example, be devices of the same type as that the electronic device 101 or devices of different types from that of the electronic device 101. According to an example, the server 106 may include a group of one or more servers. According to various examples, all or some of the operations executed in the electronic device 101 may be carried out in another electronic device or a plurality of electronic devices (for example, the electronic device 102 or 104 and the server 106). According to an example, when the electronic device 101 should perform some functions or services automatically or by a request, the electronic device 101 may make a request for performing at least some functions related to the functions or services to another device (for example, the electronic device 102 or 104, or the server 106) instead of performing the functions or services by itself or in addition to itself. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

Figure 2:
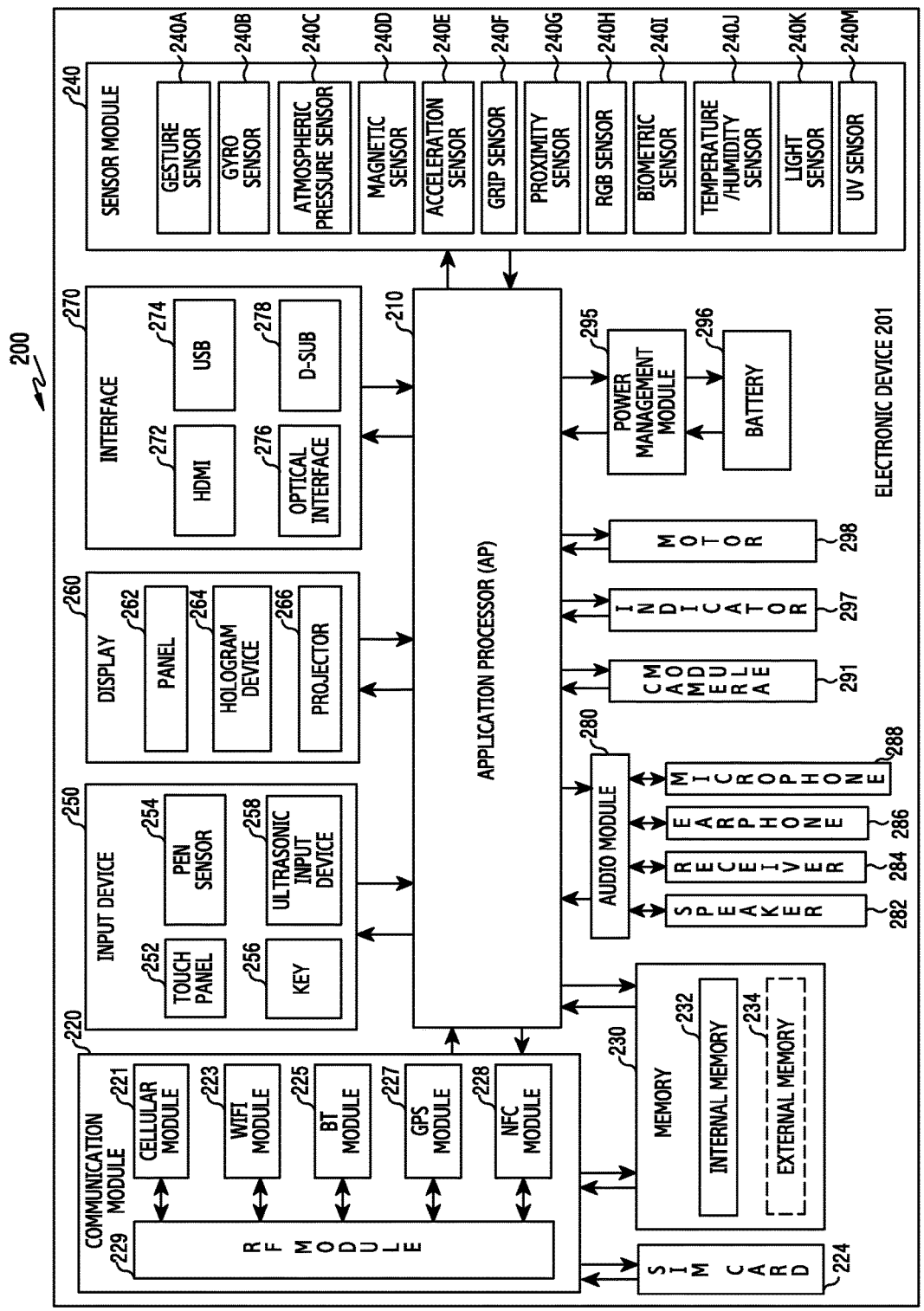
FIG. 2 is a block diagram illustrating an example electronic device.

FIG. 2 is a block diagram illustrating an example electronic device 200. The electronic device 200 may include all or some of the components of the electronic device 100 illustrated in FIG. 1. The electronic device 200 may include one or more processors (e.g., AP 210), a communication module 220, a subscriber identity module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an OS or an application program to control a plurality of hardware or software components connected to the processor 210 and to perform a variety of data processing and operations. The processor 210 may be implemented in a SoC (system on chip). According to an example, the processor 210 may further include a GPU (graphic processing unit) and/or an image signal processor.

The communication module 220 (e.g., the communication interface 170) may, for example, perform data transmission/reception in communication between the electronic device 200 (e.g., the electronic device 100) and other electronic devices (e.g., the electronic device 102 or the server 104) connected via a network. According to an example, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identification module (e.g., a SIM card 224). According to an example, the cellular module 221 may perform at least a portion of functions that may be provided by the processor 210. For example, the cellular module 221 may perform at least a portion of a multimedia control function.

According to an example, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the processor 210 in FIG. 2, according to an example, the processor 210 may be implemented to include at least a portion (e.g., the cellular module 221) of the above-described elements.

The processor 210 or the cellular module 221 (e.g., a communication processor) may connect a second communication for an Internet service with another electronic device (e.g., another electronic device 102 of FIG. 1) by using a first communication connection for a screen sharing service (for example, a mirroring service) with the electronic device 102. The processor 120 or the cellular module 221 (e.g., a communication processor) may provide the screen sharing service and the Internet service with the electronic device 102 by using the second communication connection.

According to an example, the processor 210 or the cellular module 221 (e.g., a communication processor) may load an instruction or data received from at least one of a non-volatile memory and other elements connected thereto onto a volatile memory, and process the same. Also, the processor 210 or the cellular module 221 may store data received from at least one of other elements or generated by at least one of other elements in a non-volatile memory.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an example, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an example, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identification module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 130) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an example, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 200 via various interfaces. According to an example, the electronic device 200 may further include a storage device (or a storage medium) such as a hard drive.

The sensor module 240 may measure a physical quantity or detect an operation state of the electronic device 200, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 200 via an input tool generating an ultrasonic signal, and enables wireless recognition. According to an example, the electronic device 200 may receive a user input from an external device (e.g., a computer or a server) connected to the communication module 220 using the communication module 220.

The display 260 (e.g., the display 160) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 200. According to an example, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a mobile high-definition link (MHL) interface, a secure digital (SD) card/multimedia card (MMC) interface, or an infrared data association (IrDA) standard interface.

The audio module 280 may convert a sound and an electric signal in dual directions. At least a partial element of the audio module 280 may be included, for example, in the I/O interface 150 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 200. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an example, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 200 using the stored or generated electricity. The battery 296 may include, for example, a rechargeable battery or a solar battery.

The indicator 297 may display a specific state of the electronic device 200 or a portion thereof (e.g., the processor 210), for example, a booting state, a message state, or a charging state, etc. The motor 298 may convert an electric signal to mechanical vibration. Though not shown, the electronic device 200 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

Each of the above-described component elements of hardware according to the disclosure may be configured with one or more components, and the names of the corresponding component elements may vary based on the type of electronic device. The electronic device according to various examples of the disclosure may include at least one of the aforementioned elements. Some elements may be omitted or other additional elements may be further included in the electronic device. Also, some of the hardware components according to various examples may be combined into one entity, which may perform functions identical to those of the relevant components before the combination.

Figure 3:
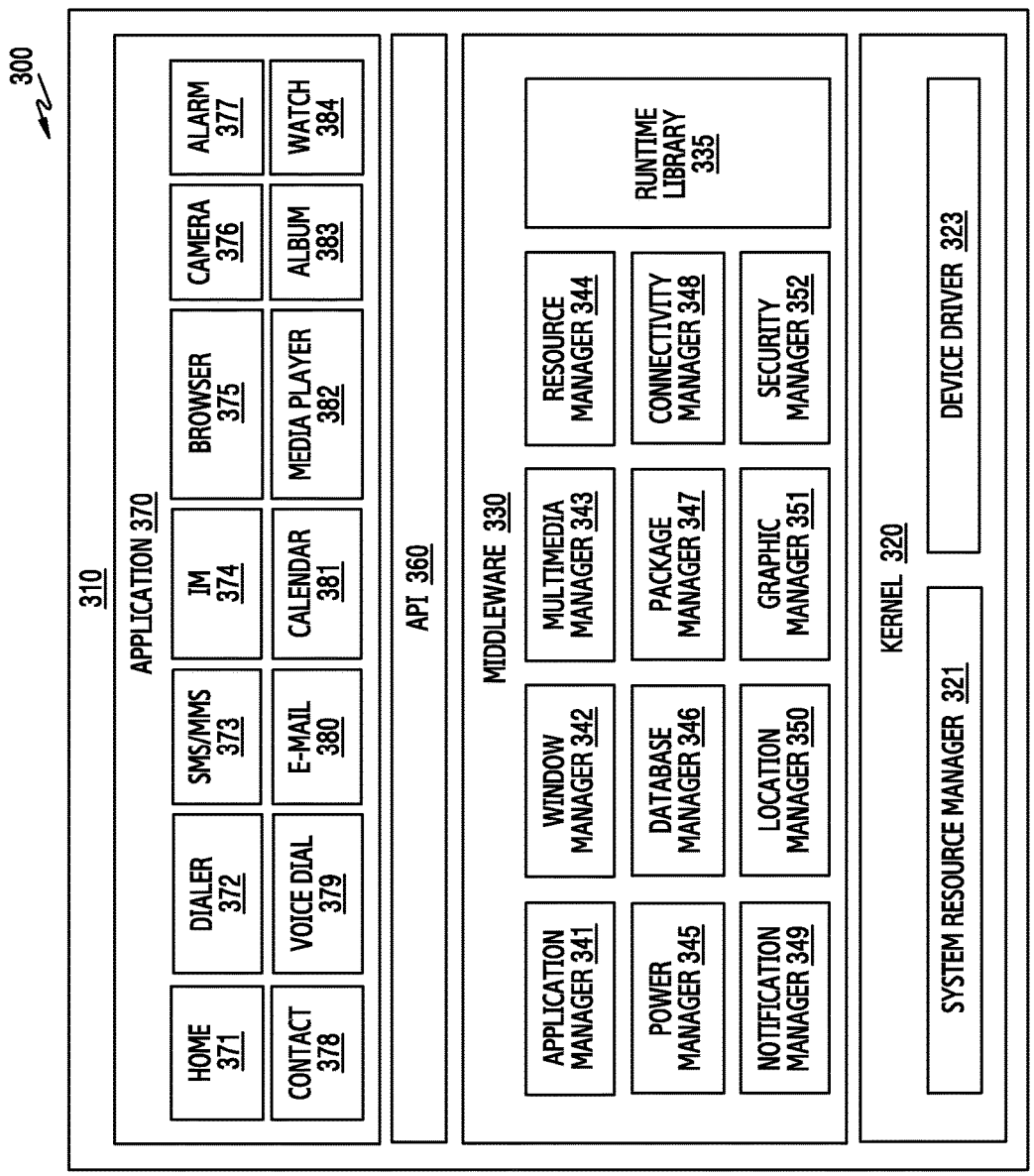
FIG. 3 is a block diagram illustrating an example program module.

FIG. 3 is a block diagram 300 illustrating an example program module 310.

According to an example, the program module 310 (for example, the program 140) may include an Operation System (OS) for controlling resources related to an electronic device (for example, the electronic device 101) and/or various applications (for example, the application 147) driven on the OS. For example, the OS may be Android, iOS, Windows, Symbian, Tizen, Bada, or the like.

The program module 310 may include a kernel 320, middleware 330, an Application Programming Interface (API) 360, and/or an application 370. At least part of the program module 310 may be preloaded on the electronic device or downloaded from a server (for example, the server 106).

The kernel 320 (for example, the kernel 141 of FIG. 1) may include a system resource manager 321 or a device driver 323. The system resource manager 321 may control, allocate or collect the system resources. According to an example, the system resource manager 321 may include a process manager, a memory manager, a file system manager, and the like. The device driver 323 may include a display driver, a camera driver, a Bluetooth driver, a shared memory driver, a Universal Serial Bus (USB) driver, a keypad driver, a WiFi driver, an audio driver, or an Inter-Process Communication (IPC) driver, for example.

The middleware 330 may provide functions which are commonly required by the application 370 or may provide various functions to the application 370 through the API 360 such that the application 370 can effectively use limited system resources in the electronic device. According to an example, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

For example, the runtime library 335 may include a library module which is used by a compiler to add a new function through a programming language while the application 370 is executed. The runtime library 335 may perform functions on input/output management, memory management, an arithmetic function, and the like.

The application manager 341 may manage a life cycle of at least one of the applications 370, for example. The window manager 342 may manage GUI resources used in a screen. The multimedia manager 343 grasps a format necessary for reproducing various media files and encodes or decodes the media files by using a Codec suited to the corresponding format. The resource manager 344 may manage resources such as a source code, a memory, or a storage space of at least one of the applications 370.

The power manager 345 operates along with a Basic Input/Output System (BIOS) to manage a battery or power and provide power information necessary for operations of the electronic device. The database manager 346 may generate, search, or change a database which is used in at least one of the applications 370. The package manager 347 may manage installing or updating an application which is distributed in the form of a package file.

The connectivity manager 348 may manage wireless connection of WiFi, Bluetooth, and the like. The notification manager 349 may display or notify an event such as a message arrived, an appointment, a notification of proximity in such a manner that the event does not hinder the user. The location manager 350 may manage location information of the electronic device. The graphic manager 350 may manage a graphic effect to be provided to the user or a relevant user interface. The security manager 352 may provide an overall security function necessary for system security or user authentication. According to an exemplary embodiment, when the electronic device (for example, the electronic device 101) is equipped with a telephony function, the middleware 330 may further include a telephony manager (not shown) to manage a speech or video telephony function of the electronic device.

The middleware 330 may include a middleware module to form a combination of the various functions of the above-described elements. The middleware 330 may provide a module which is customized according to a kind of OS to provide a distinct function. The middleware 330 may dynamically delete some of the existing elements or may add new elements.

The API 360 (for example, the API 145) may, for example, be a set of API programming functions and may be provided as a different configuration according to an OS. For example, in the case of Android or IOS, a single API set may be provided for each platform. In the case of Tizen, two or more API sets may be provided.

The application 370 (for example, the application 147) may include one or more applications for providing functions, such as a home 371, a dialer 372, a a Short Message Service (SMS)/Multimedia Messaging Service (MMS) 373, an Instant Message (IM) 374, a browser 375, a camera 376, an alarm 377, a contact 378, a voice dial 379, an email 380, a calendar 381, a media player 382, an album 383, or a watch 384, or health care (for example, measuring exercise or a blood sugar), or providing environment information (for example, information on atmospheric pressure, humidity, or temperature), for example.

According to an example, the application 370 may include an application for supporting information exchange between the electronic device (for example, the electronic device 101) and an external electronic device (for example, the electronic devices 102, 104) (hereinafter, referred to as an "information exchange application" for convenience of explanation). The information exchange application may include a notification relay application for relaying specific information to an external electronic device or a device management application for managing an external electronic device.

For example, the notification relay application may include a function of relaying notification information generated by other applications of the electronic device (for example, the SMS/MMS application, the email application, the health care application, the environment information application, and the like) to an external electronic device (for example, the electronic device 102, 104). In addition, the notification relay application may receive notification information from an external electronic device and may relay the same to the user. For example, the device management application may manage (for example, install, delete or update) at least one function of an external electronic device (for example, the electronic device 104) communicating with the electronic device (for example, turning on/off an external electronic device (or some parts) or adjusting brightness (or resolution) of a display), an application operating in the external electronic device or a service provided by the external electronic device (for example, a calling service or a message service).

According to an example, the application 370 may include an application (for example, a health care application) which is specified according to an attribute (for example, an attribute of an electronic device indicating a kind of electronic device, for example, a mobile medical device) of the external electronic device (for example, the electronic device 102, 104). According to an example, the application 370 may include an application received from an external electronic device (for example, the server 106 or the electronic devices 102, 104). According to an example, the application 370 may include a preloaded application or a third party application which may be downloaded from a server. The names of the elements of the program module 310 according to the illustrated examples may be changed according to a kind of OS.

According to various examples, at least part of the program module 310 may be implemented by software, firmware, hardware, e.g., electronic circuitry, or a combination of two or more of them. At least part of the program module 310 may be implemented (for example, executed) by a processor (for example, the AP 210). At least part of the program module 310 may include a module, a program, a routine, sets of instructions, or a process to perform one or more functions, for example.

The term "module" used in various examples refers to a unit including one of hardware, software, and firmware, or a combination of two or more of them, for example. For example, the "module" may be used interchangeably with terms like unit, logic, logical block, component, electronic circuitry or circuit. The "module" may be a minimum unit of an integrally configured part or a part of it. The "module" may be a minimum unit that performs one or more functions or a part of it. The "module" may be implemented mechanically or electronically. For example, the "module" may include at least one of an Application Specific Integrated Circuit (ASIC) chip, Field Programmable Gate Arrays (FPGAs), and a programmable logic device which perform any operation that is already well known or will be developed in the future.

At least part of the apparatus (for example, modules or functions) or method (for example, operations) according to various examples may be implemented using instructions stored in a computer-readable storage medium in the form of a programming module. When the instructions are executed by a processor (for example, the processor 120), the one or more processors may perform a function corresponding to the instructions. The computer-readable storage medium may be the memory 130, for example.

Examples of the computer-readable recording medium include, for example, hard disks, floppy disks, magnetic media (for example, magnetic tapes), optical media (for example, Compact Disc Read Only Memories (CD-ROMs) and Digital Versatile Disc (DVDs)), magneto-optical media (for example, floptical disks), and hardware devices (for example, Read Only Memories (ROMs), Random Access Memories (RAMs) and flash memories). In addition, examples of the program commands include, for example, machine language codes created by a compiler, and high-level language codes that can be executed by a computer by using an interpreter. The above-described hardware devices may be configured to operate as one or more software modules for performing operations of various examples of the present disclosure, and vice versa.

A module or program module according to various examples may include one or more of the above-described elements, may omit some elements, or may further include additional elements. The operations performed by the module, the program module, or the other elements according to various examples may be performed serially, in parallel, repeatedly, or heuristically. In addition, some operation(s) may be performed in different order or may be omitted, and an additional operation may be added.

Although specific examples of the disclosure are illustrated in the drawings and relevant detailed descriptions are provided, various changes can be made and various examples may be provided. Accordingly, the various examples of the disclosure are not limited to the specific examples and should be construed as including all changes, equivalents or substitutes included in the ideas and technological scopes of the examples of the disclosure.

Figure 4:
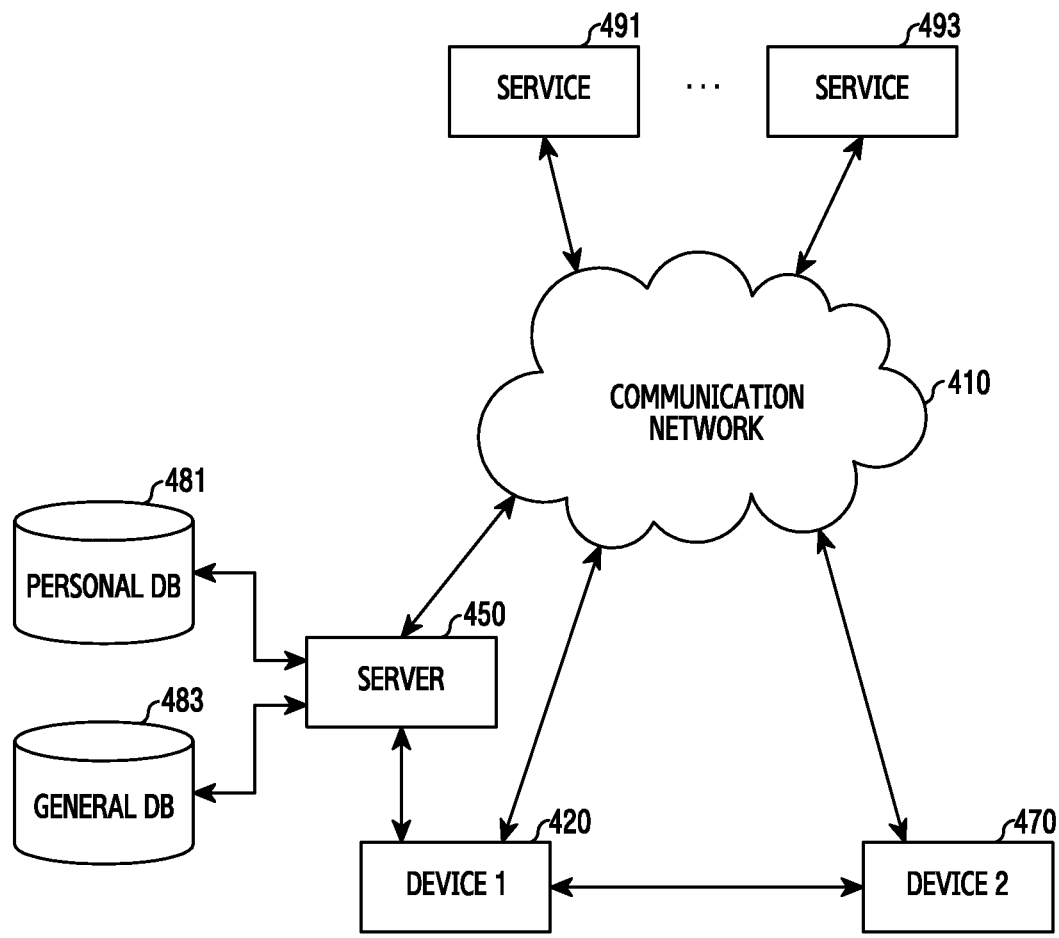
FIG. 4 is a view illustrating an example network environment including an electronic device.

FIG. 4 illustrates a network environment including an electronic device.

Referring to FIG. 4, a communication network 410 according to an example may be connected with device 1 420, a server 450, device 2 470, and various services 491, 493. Device 1 420 may include the entirety or part of the electronic device 101 shown in FIG. 1, and device 2 470 may include the entirety or part of the external electronic device 102 or the external electronic device 104 shown in FIG. 1. In addition, the communication network 410 may include the entirety or part of the network 162 shown in FIG. 1, and the server 450 may include the entirety or part of the server 106 shown in FIG. 1.

Device 1 420 and device 2 470 may be included in terminals in a wireless communication system, and may communicate with each other wirelessly. In addition, device 1 420 or the server 450 may include at least part of a personal assistant function.

The server 450 may, for example, be an electronic device according to an example, and may be referred to as a personal assistant server, and may be connected with device 1 420 and the communication network 410 to provide necessary information to device 1 420. In addition, information related to a specific electronic device connected to the server 450 may be stored in a predetermined memory, such as a volatile or non-volatile memory, through the server 450, as, for example, a personal database (DB) 481. In addition, generalized information related to a plurality of electronic devices connected with the server 450 may be stored in a predetermined memory, such as a volatile or non-volatile memory, through the server 450, as, for example, a general DB 483. In addition, the services 491, 493 refer to service providers which provide general information to the electronic device according to an example.

Figure 5:
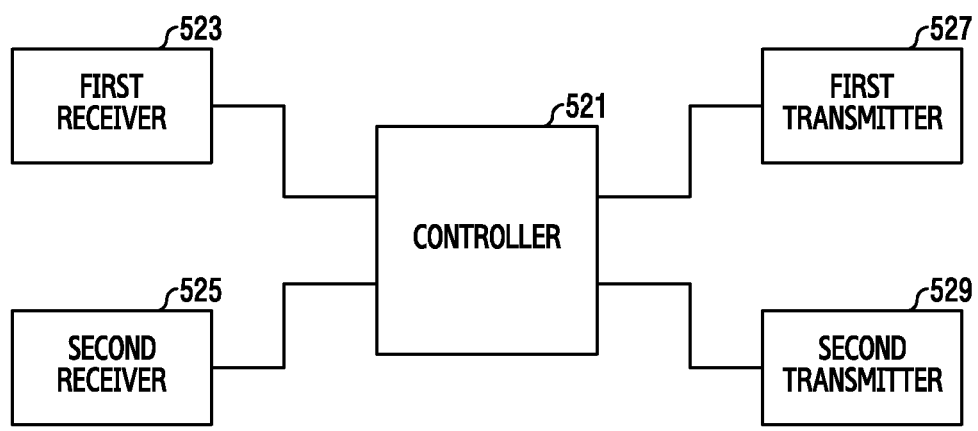
FIG. 5 is a block diagram illustrating an example first electronic device.

FIG. 5 is a block diagram illustrating an example first electronic device.

Referring to FIG. 5, the first electronic device may include a controller 521, a first receiver 523, a second receiver 525, a first transmitter 527, and a second transmitter 529. The first electronic device may include the entirety or part of the electronic device 101 shown in FIG. 1 or the electronic device 200 shown in FIG. 2. In addition, device 1 420 of FIG. 4 may include the entirety or part of the first electronic device of FIG. 5.

The first electronic device according to an example may include: the first receiver 523 which receives a first signal from a second electronic device; the controller 521 which is configured to generate a response signal corresponding to the first signal based on context awareness information related to the first electronic device, mutual information between the users of the first electronic device and the second electronic device, and the first signal; and the second transmitter 529 which transmits the response signal to the second electronic device. In addition, the first electronic device may include the first receiver 523 which receives the first signal from the second electronic device, and the second receiver 525 which receives data corresponding to the first signal from a server.

First, the first electronic device may receive the first signal from the second electronic device through the first receiver 523. In this case, the first signal may include not only a voice signal, a video signal, a text signal, and a bio signal, but also a combination signal of the above-mentioned signals. Thereafter, the first electronic device may transmit, to the server, the first signal, the context awareness information related to the first electronic device, and the mutual information between the users of the first electronic device and the second electronic device through the first transmitter 527.

In this case, the mutual information may, for example, indicate relationship information between the user of the first electronic device and the user of the second electronic device, and the mutual information between the users of the first electronic device and the second electronic device may, for example, include information on a social distance between the users. For example, the user of the first electronic device and the user of the second electronic device may be friends or the user of the second electronic device may be the boss of the user of the first electronic device.

The social distance may be determined based on the frequency of conversations via a voice, a text or a video, the contents of the conversations, the amount of the conversation or the like. In addition, the above-described variables may affect one another. The weight of the social distance may be applied to language mainly used in a conversation proceeding between the persons with a high frequency of conversations, or linguistic characteristics used only between the persons with a high frequency of conversations. In addition, when a social distance should be determined for a future counterpart who uses similar language, the linguistic characteristics may be applied to estimation of a social distance regarding the conversion contents.

In addition, the social distance may be affected by politeness of language or may be affected by implication of language. For example, the politeness of language may be determined with reference to a language dictionary which indicates the degree of politeness according to linguistic characteristics of each country. In addition, in determining the social distance, the politeness of language may act dually with the frequency of conversations. When much impolite language is used in a conversation made between persons who have very little contact with each other, a long social distance may be determined, but, when much impolite expressions are used in a conversation with a counterpart with a high frequency of conversation, the weight of a short social distance may be applied to the impolite expressions.

For example, the controller 521 may be configured to determine what relationship the user of the second electronic device has with the user of the first electronic device, and may transmit a signal corresponding to the determination to the server through the first transmitter 527 or to the second electronic device.

For example, when the user of the second electronic device is the boss of the user of the first electronic device, the controller 521 may be configured to determine the relationship between the users to be a superordinate relationship with reference to the user of the first electronic device, and, when the user of the first electronic device and the user of the second electronic device are friends, the relationship between the users may be determined to be an equal relationship.

In addition, the context awareness information may, for example, include overall environment information on the user of the first electronic device. For example, the context awareness information may include a calendar schedule, a variety of information included in an email, a Short Message Service (SMS), and a messenger, personal information such as birthday, names and phone numbers of other users, environment information such as traffic, an ambient noise and weather, information on a heart rate acquired through a Heart Rate Monitor (HRM), information related to the user of the first electronic device, which is written on a Social Networking Service (SNS), ambient illumination, humidity, altitude, temperature, acceleration change, a magnetic field value, and the like, which are included in a specific terminal.

For example, the user of a specific terminal may store the user's own meeting schedule in a separate storage device which is included in the first electronic device according to an example, or is connected with the first electronic device. When a user of another terminal makes a call while the user of the terminal is attending a meeting according to the meeting schedule, the first electronic device identifies the meeting schedule pre-stored therein and thus transmits a response corresponding to the situation that the user of the specific terminal is currently in, for example, a response saying "Sony, I am in a meeting. Please call me later!" to another terminal.

According to another example, the first electronic device may respond to a counterpart terminal according to a condition pre-defined by the user of the first electronic device. As in the above-described example, while attending the meeting, the user of the specific terminal may set the first electronic device to generate a response corresponding to the meeting situation and respond to a call from another terminal in advance. In this case, when the user of another terminal makes a call while the user of the specific terminal is attending the meeting, the first electronic device may transmit the response corresponding to the current meeting situation, for example, the response saying "Sony, I am in a meeting. Please call me later!," to another terminal based on user's prior settings indicating that the user is attending the meeting. Examples of this operation will be explained in detail below FIG. 11.

In addition, the controller 521 may be configured to include an operation requesting authentication from the second electronic device based on a relation level between the users of the first electronic device and the second electronic device, an authentication method, or an query level, which is determined by the server, and, when the authentication is completed, the controller 521 may be configured to transmit an authentication completion signal to the server through the first transmitter. The above-described authentication may be performed to adjust the level of the response signal.

For example, the first receiver 523 may receive information on the relation level, the authentication method, or the query level from the server. The relation level is to classify the relationship between the user of the first electronic device and the user of the second electronic device according to an example according to a specific range. In this case, the relation level may be digitized or labeled. For example, the relation level may be determined as a user himself/herself level (first level), a family level (second level), a friend level (third level), a colleague level (fourth level), or other level (fifth level).

The server may determine to which relation level the user of the second electronic device belongs and transmit corresponding information to the first electronic device. In this case, it may be determined to which relation level the user of the second electronic device belongs based on the context awareness information, such as a variety of information included in an email, an SMS, and a messenger, names and phone numbers of other users, or personal information such as birthday, as described above. For example, as the frequency of conversations made between the user of the first electronic device and the user of the electronic device becomes higher, the user of the second electronic device may be determined to have a higher relation level.

Thereafter, the server may determine an authentication method according to the determined relation level. For example, the authentication method may include a method in which the user of the second electronic device is required to input a pre-defined password, a method in which the user of the second electronic device is required to respond to a pre-defined question related to the user of the first electronic device, and a method which recognizes the fingerprint or iris of the user of the second electronic device. For example, when the method of authenticating by responding to the pre-defined question is employed, the level of difficulty of the question is adjusted according to the relation level, such that an authentication method corresponding to the determined relation level can be selected. For example, as the relation level is higher, the user of the second electronic device may be authenticated through a question indicating a closer relationship with the user of the first electronic device.

In addition, as will be described later, when the query included in the first signal is at such a level that the query does not particularly require authentication, as a result of understanding an intention corresponding to the first signal, the server may be configured to generate response data corresponding to the first signal regardless of the determined relation level or authentication method. For example, when the query included in the first signal is not a sensitive level in relation to the personal information of the user of the first electronic device, and includes a simply comprehensive and general content, the server may generate the response data corresponding to the first signal regardless of the determined relation level or authentication method.

For example, when the reliability of the relation level determined by the server is higher than or equal to a first threshold value, the server recognizes the relationship with the user of the first electronic device, and, when the reliability of the relation level is lower than the first threshold value, the server may deny the relationship with the user of the first electronic device. For example, the first threshold value may be a friend level (third level), and, only when the relation level is higher than or equal to the friend level, that is, the third level, the relationship with the user of the first electronic device may be recognized. In addition, when the reliability of the relation level determined by the server is lower than the first threshold value and is higher than or equal to a second threshold value, the server may use an additional authentication method to make the reliability of the relation level higher than or equal to the first threshold value.

When the relation level with the user of the second electronic device and the corresponding authentication method are determined, the controller 521 may be configured to request authentication from the second electronic device. When the method of authenticating by responding to a pre-defined question is employed as in the above-described example, the controller 521 may be configured to transmit a pre-defined question through the second transmitter 529. When the second electronic device transmits a correct response in response to the question, and the first receiver 523 receives the response, the controller 521 may be configured to determine that the authentication is completed, and transmit an authentication completion signal to the server through the first transmitter 527. When the second electronic device transmits an incorrect response and the first receiver 523 receives the same, or when the second electronic device does not transmit any response, the controller 521 may be configured to determine that the authentication is not completed, and transmit an authentication incompletion signal to the server through the first transmitter 527.

In the above-described example, the server determines the relation level and the authentication method. However, according to another example, the controller 521 included in the first electronic device may be configured to determine the relation level and the authentication method. In this case, the controller 521 may be configured to determine the relation level and the authentication method according to the same procedure as the operation of determining the relation level and the authentication level by the server. In addition, the above-described authentication procedure may be omitted according to the intention of the first signal, which will be described later. For example, when the first signal includes a sensitive query related to the personal information of the user of the first electronic device, as a result of understanding the intention of the first signal, the authentication procedure still proceeds, whereas, when the first signal includes a relatively general and less sensitive query, the above-described authentication procedure may be omitted.

Next, the first electronic device may receive the data corresponding to the first signal from the server through the second receiver 525. The data may include information responding to a specific query or request included in the first signal.

According to an example, the response data may be generated by the server which is connected with the first electronic device. In other words, the server may understand the intention corresponding to the first signal, and generate the response data corresponding to the first signal based on the intention and the mutual information.

The intention corresponding to the first signal may be determined through a verbal expression or a non-verbal expression included in the first signal. For example, the intention corresponding to the first signal may be determined through Natural Language Processing (NLP). For example, when the first signal is a voice signal, the server may convert the first signal into a text signal and then analyze the meaning of the signal. For example, the server may analyze the meaning of the text signal through morpheme analysis, syntax analysis, etc. In addition, the server may analyze whether the intention of the text signal is to ask a question, make a request, or simply express a feeling through speech act analysis, and may understand the intention of the first signal as a result of the analyzing.

Alternatively, the intention corresponding to the first signal may, for example, be determined through a non-verbal expression. For example, when the first signal is a voice signal, the intention corresponding to the first signal may be determined through a non-verbal expression, such as a speech rate, a tone, an intonation, a speech pattern, or a stammer of a speaker, a sigh or cough given while the speaker is speaking, etc. In addition, when the first signal is a video signal, the intention corresponding to the first signal may be determined through a non-verbal expression such as a look or a complexion of the speaker.

In addition, the query or request included in the first signal may be accumulated in a storage device which exists in the first electronic device or exists separately from the first electronic device. As a result, the intention of the first signal may be determined based on existing queries or accumulated requests.

In addition, when violence higher than a certain level is detected in the first signal, for example, when the first signal includes a content like a swearing word or criticism, as a result of understanding the intention of the first signal, the server may convert the content included in the first signal into a content in which the violence is mitigated to be lower than the certain level, and transmit a signal including the converted content to the first electronic device. For example, the user of the first electronic device may recognize only the content in which the violence is mitigated when the user identifies the content of the first signal afterward.

The server may generate data corresponding to the first signal based on the intention of the first signal understood as described by way of example above, the context awareness information, and the mutual information between the users of the first electronic device and the second electronic device. For example, the data may be generated based on response information corresponding to the intention of the first signal. For example, the response information may be predetermined and stored in the server or an external device connected with the server, or may be stored in the first electronic device or an external device connected with the first electronic device. The server may generate the data by selecting specific information included in the response information or may generate the data by combining a plurality of pieces of information included in the response information.

In addition, the server may generate the data based on the mutual information. The mutual information may be received from the first electronic device or the server may determine the mutual information according to the same operation as the operation of generating the mutual information by the first electronic device according to circumstances.

For example, when the user of the second electronic device is the boss of the user of the first electronic device, the first electronic device may determine the relationship between the users to be a superordinate relationship with reference to the user of the first electronic device, and, when the user of the first electronic device and the user of the second electronic device are friends, the first electronic device may determine the relationship between the users to be an equal relationship, and transmit information on the relationship to the server.

In the above-described example, when the server receives the mutual information including the superordinate relationship information from the first electronic device, the server may consider the mutual information in generating the data. For example, the server may consider the mutual information including the superordinate relationship information in selecting specific information included in the response information or combining the plurality of pieces of information included in the response information, and as a result, may generate the data by selecting or combining information indicating more polite and more formal expressions. Detailed examples will be explained below with reference to FIG. 11.

In general, the form of the data may be determined to correspond to the form of the first signal. For example, when the first signal is a voice signal, the data may also be determined to be voice data. However, the form of the response data is not necessarily determined to correspond to the first signal, and may be determined to be data of a different form based on circumstances.

In the above-described examples, the data is generated through the server. However, this should not be considered as limiting. According to another example, the data may be generated by the controller 521 which is included in the first electronic device. In this case, the controller 521 may be configured to generate the data according to the same procedure as the operation described above, and the controller 521 may be configured to generate the response signal based on the data.

The first electronic device may transmit the response signal to the second electronic device through the second transmitter 529, and then finishes connecting with the second electronic device.

According to an example, the first electronic device may transmit the response signal to the second electronic device even when connection with the second electronic device is not established or the first electronic device does not receive the first signal. For example, the first electronic device may collect information on an action that the user of the first electronic device has carried out with the user's own intention without a direct request from the outside, and a variable which causes the action. Thereafter, when an event including a variable similar to the variable which causes the specific action occurs, the first electronic device may configure an action corresponding the variable and carry out the action.

For example, if the user of the first electronic device has sent a message saying "Happy New Year!" to the user's acquaintances at the end of each year, the first electronic device may collect context information such as an action of sending a message and the end of each year. When the user does not send a message to the acquaintances even at the end of the year, the first electronic device may configure the message as it is or reconfigure the message and transmit the same, or at least induce the user to send the message. In this case, the operation of collecting the information and configuring the corresponding action may be performed by another device which is connectable with the first electronic device, for example, the server.

According to an example, the first electronic device may perform the above-described operations based on a specific model. For example, the first electronic device or the server connected with the first electronic device may configure a specific model by collecting and classifying data related to a specific user group, for example, a group of man office workers in their late 30s, and the first electronic device may respond to a query or request of the user of the second electronic device based on the model. The user of the first electronic device may change the model based on circumstances, and, in this case, the first electronic device may respond to the query or request of the user of the second electronic device based on the changed model.

According to an example, the first electronic device may communicate with a plurality of counterparts. For example, when there is a call from a third terminal while the first electronic device communicates with a second terminal including the second electronic device, the first electronic may receive the call and communicate with the second terminal and the third terminal simultaneously.

According to an example, the second electronic device may perform the same function as the first electronic device, and, based on circumstances, the first electronic device and the second electronic device may directly communicate with each other without intervention of the user of the first electronic device and the user of the second electronic device. For example, when the user of the second electronic device sets reservation sending and the second electronic device directly makes a call to the user of the first electronic device, but the user of the second electronic device is unable to receive the call, the first electronic device may directly receive the call and respond to the query or request of the second electronic device in the same manner as described above. In another example, when the user of the first electronic device and the user of the second electronic device arrange a meeting schedule while communicating with each other, the user of the first electronic device may execute the first electronic device and the user of the second electronic device may execute the second electronic device, such that the first electronic device and the second electronic device identify registered schedules of their respective users, directly communicate with each other, and determine the meeting schedule.

Figure 6:
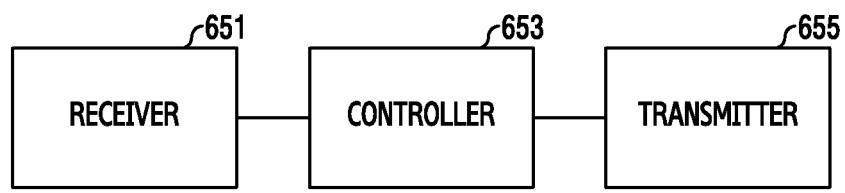
FIG. 6 is a block diagram illustrating an example server.

FIG. 6 is a block diagram illustrating an example server.

Referring to FIG. 6, the server may include a receiver 651, a controller 653, and a transmitter 655. For example, the server may include the entirety or part of the server 106 shown in FIG. 1.

According to an example, the server may include: the receiver 651 which receives, from a first electronic device, context awareness information related to the first electronic device, mutual information between the users of the first electronic device and a second electronic device, and a first signal transmitted by the second electronic device; the controller 653 may be configured to determine an intention corresponding to the first signal and to generate data corresponding to the first signal based on the intention, the context awareness information, and the mutual information; and the transmitter 655 which transmits the data to the first electronic device.

According to an example, the server may receive the first signal, the context awareness information related to the first electronic device, and the mutual information between the users of the first electronic device and the second electronic device through the receiver 651. The first signal may include not only a voice signal, a video signal, a text signal, a bio signal, but also information of a combination of the above-mentioned signals, and the first signal may be received from the first electronic device which receives the first signal from the second electronic device.

In addition, the context awareness information may refer to overall environment information on the user of the first electronic device. For example, the context awareness information may include a calendar schedule, a variety of information included in an email, an SMS, and a messenger, personal information such as birthday, names and phone numbers of other users, environment information such as traffic, an ambient noise and weather, and information on a heart rate acquired through an HRM, which are included in a specific terminal.

In addition, the mutual information between the users of the first electronic device and the second electronic device may include information on a social distance between the users. For example, the user of the first electronic device and the user of the second electronic device may be friends or the user of the second electronic device may be the boss of the user of the first electronic device.

The server may determine the intention corresponding to the first signal through the controller 653, and generate the data corresponding to the signal based on the intention and the mutual information.

The intention corresponding to the first signal may be determined through a verbal expression or a non-verbal expression included in the first signal. For example, the intention corresponding to the first signal may be determined through NLP. For example, when the first signal is a voice signal, the controller 653 may be configured to convert the first signal into a text signal and then analyze the meaning of the signal. For example, the controller 653 may be configured to analyze the meaning of the text signal through morpheme analysis, syntax analysis, etc. In addition, the controller 653 may be configured to analyze whether the intention of the text signal is to ask a question, make a request, or simply express a feeling through speech act analysis, and may understand the intention of the first signal as a result of the analyzing.

The intention corresponding to the first signal may be determined through a non-verbal expression. For example, when the first signal is a voice signal, the intention corresponding to the first signal may be determined through a non-verbal expression such as a speech rate, a tone, an intonation, a speech pattern, or stammer of a speaker, a sigh or cough given while the speaker is speaking, etc. In addition, when the first signal is a video signal, the intention corresponding to the first signal may be determined through a non-verbal expression such as a look or a complexion of the speaker.

In addition, a query or request included in the first signal may be accumulated in a storage device which exists in the first electronic device or exists separately from the first electronic device. As a result, the intention of the first signal may be understood based on existing queries or accumulated requests.

The controller 653 may be configured to determine a relation level between the users of the first electronic device and the second electronic device, and an authentication method based on the relation level. The authentication is performed in order to adjust the level of a response signal to be transmitted to the second electronic device. The relation level is to classify the relationship between the user of the first electronic device and the user of the second electronic device according to an example according to a specific range. For example, the relation level may be determined as a user himself/herself level (first level), a family level (second level), a friend level (third level), a colleague level (fourth level), or other levels (fifth level).

The controller 653 may be configured to determine to which relation level the user of the second electronic device belongs and to transmit corresponding information to the first electronic device through the transmitter 655. For example, it may be determined to which relation level the user of the second electronic device belongs based on the context awareness information, such as a variety of information included in an email, an SMS, and a messenger, names and phone numbers of other users, and personal information such as birthday, as described above. For example, as the frequency of conversations made between the user of the first electronic device and the user of the second electronic device using a messenger is higher, the user of the second electronic device may be determined to have a higher relation level.

The controller 653 may be configured to determine the authentication method based on the determined relation level. For example, the authentication method may include a method in which the user of the second electronic device is required to input a pre-defined password, and a method in which the user of the second electronic device is required to respond to a pre-defined question related to the user of the first electronic device. For example, when the method of authenticating by responding to the pre-defined question is employed, the level of difficulty of the question is adjusted based on the relation level, such that an authentication method corresponding to the determined relation level can be selected. For example, as the relation level is higher, the user of the second electronic device may be authenticated through a question indicating a closer relationship with the user of the first electronic device.

When the relation level of the user of the second electronic device and the corresponding authentication method are determined, the transmitter 655 may transmit the information on the relation level and the authentication method to the first electronic device in order to request authentication from the second electronic device. The first electronic device may perform an authentication procedure with the second electronic device in the method described above with reference to FIG. 5, and transmit the result of the authentication procedure, for example, an authentication completion signal or an authentication incompletion signal, to the server. The receiver 651 may receive the signal on whether the second electronic device is authenticated or not from the first electronic device.

In addition, the above-described authentication procedure may be omitted based on the intention of the first signal. For example, when the first signal includes a sensitive query related to the personal information of the user of the first electronic device, as a result of understanding the intention of the first signal, the authentication procedure still proceeds, whereas, when the first signal includes a relatively general and less sensitive query, the above-described authentication procedure may be omitted. In addition, when a reliability value of identity of the user of the second electronic device exceeds a predetermined threshold and the relation level related to the identity of the user of the second electronic device is determined to be closer than the relation level required by the understood intention, a function of omitting the above-described authentication procedure may be included.

The controller 653 may be configured to generate the data corresponding to the first signal based on the intention of the first signal determined as described above, the context awareness information, and the mutual information between the users of the first electronic device and the second electronic device. For example, the data may be generated based on response information corresponding to the intention of the first signal. For example, the response information may be predetermined and stored in the server or an external device connected with the server, or may be stored in the first electronic device or an external device connected with the first electronic device. The controller 653 may be configured to generate the data by selecting specific information included in the response information or may generate the data by combining a plurality of pieces of information included in the response information.

In addition, the controller 653 may be configured to consider whether the second electronic device is authenticated or not in generating the data. For example, when the authentication completion signal is received from the first electronic device through the receiver 651, the controller 653 may be configured to generate data including an appropriate response to the first signal. For example, when the authentication incompletion signal is received from the first electronic device through the receiver 651, the controller 653 may be configured to generate data including a content indicating that it is impossible to respond to the query or request included in the first signal.

In addition, the controller 653 may be configured to generate the data based on the mutual information. The mutual information may be received from the first electronic device, or based on circumstances, the server may determine the mutual information according to the same operation as the operation of the generating the mutual information by the first electronic device.

For example, when the user of the second electronic device is the boss of the user of the first electronic device, the first electronic device may determine the relationship between the users to be a superordinate relationship with reference to the user of the first electronic device, and, when the user of the first electronic device and the user of the second electronic device are friends, the first electronic device may determine the relationship between the users to be an equal relationship, and transmit information on the relationship to the server.

In the above-described example, when the server receives the mutual information including the superordinate relationship information from the first electronic device through the receiver 651, the controller 653 may be configured to consider the mutual information in generating the data. For example, the controller 653 may be configured to consider the mutual information including the superordinate relationship information in selecting specific information included in the response information or combining the plurality of pieces of information included in the response information, and as a result, may generate the data by selecting or combining information indicating more polite and more formal expressions. Detailed examples thereof will be explained below with reference to FIG. 11.

In general, the form of the data may be determined to correspond to the form of the first signal. For example, when the first signal is a voice signal, the data may also be determined to be voice data. However, the form of the data is not necessarily determined to correspond to the first signal, and may be determined to be data of a different form according to circumstances.

The server transmits the data to the first electronic device through the transmitter 655.

Figure 7:
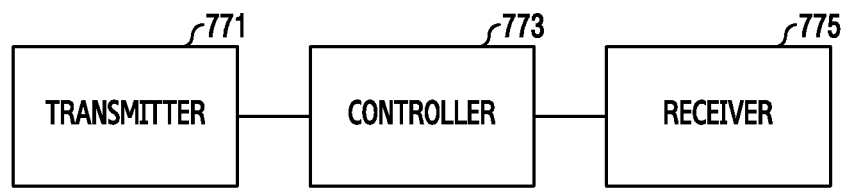
FIG. 7 is a block diagram illustrating a second electronic device.

FIG. 7 is a block diagram illustrating an example second electronic device.

Referring to FIG. 7, the second electronic device according to an example may include a transmitter 771 which transmits a first signal to a first electronic device, and a receiver 775 which receives a first response signal corresponding to the first signal from the first electronic device, and a controller 773. In addition, the second electronic device may include the entirety or part of the external electronic device 102 or the external electronic device 104 shown in FIG. 1.

The second electronic device may transmit the first signal to the first electronic device through the transmitter 771, and the first signal may include not only a voice signal, a video signal, and a text signal, but also a combination signal of the above-mentioned signals.

The second electronic device receives a response signal corresponding to the first signal from the first electronic device through the receiver 775, and the response signal may be generated based on an intention corresponding to the first signal and mutual information between the users of the first electronic device and the second electronic device. Detailed examples thereof will be explained below with reference to FIG. 11.

In addition, according to the authentication procedure described above with reference to FIGS. 5 and 6, the transmitter 771 may transmit a second signal corresponding to an authentication request received from the first electronic device to the first electronic device.

In addition, according to an example, the second electronic device may include a controller 773 which may be configured to generate a second response signal corresponding to the first response signal based on the first response signal, context awareness information related to the second electronic device, and mutual information between the users of the first electronic device and the second electronic device, and the transmitter 771 may transmit the second response signal to the first electronic device. The first electronic device and the second electronic device may directly communicate with each other without intervention of the respective users of the electronic devices.

Figure 8:
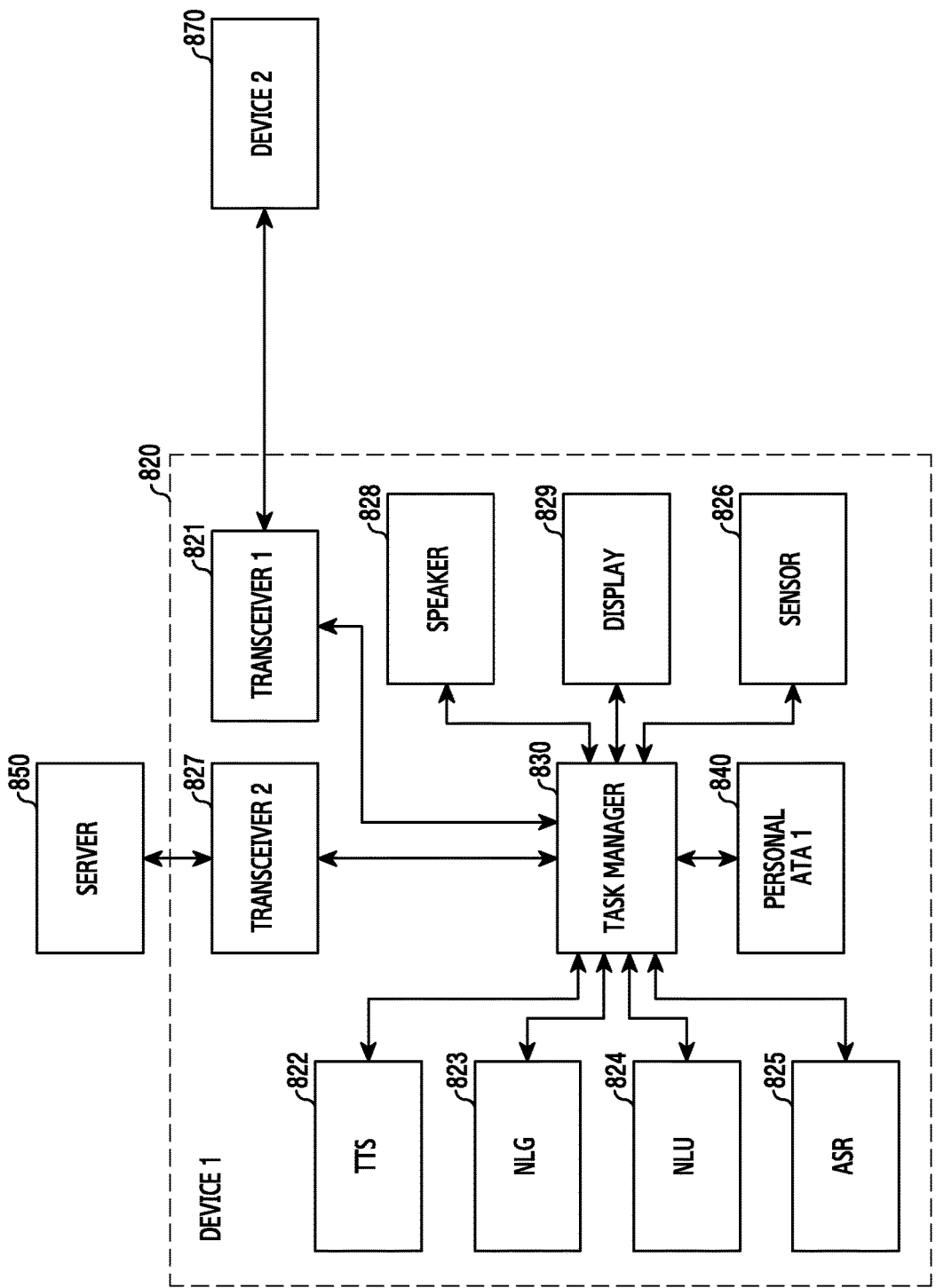
FIG. 8 is a block diagram illustrating an example network environment including a first electronic device.

FIG. 8 is a view illustrating an example network environment including a first electronic device.

Referring to FIG. 8, device 1 820 may be connected to a server 850 and device 2 870. For example, device 1 820 and device 2 870 may be referred to as a first electronic device and a second electronic device, respectively, and device 1 820 and device 2 870 may be included in terminals in a wireless communication system. In addition, device 1 820 may include the entirety or part of the electronic device 101 shown in FIG. 1 or may include the entirety or part of the electronic device 200 shown in FIG. 2, for example. In addition, device 2 870 may include the entirety or part of the external electronic device 102 or the external electronic device 104 shown in FIG. 1, and the server 850 may include the entirety or part of the server 106 shown in FIG. 1.

According to an example, a task manager 830 may establish connection with device 2 870, and device 1 820 may receive a first signal from device 2 870 through transceiver 1 821. In addition, the task manager 830 may transmit the first signal and mutual information between the users of device 1 820 and device 2 870 to the server 850 through transceiver 2 827. Transceiver 2 827 may receive data corresponding to the first signal, and transceiver 1 821 may transmit a response signal based on the data to device 2 870.

The task manager 830 may establish connection with device 2 870. The task manager 830 may complete connection establishment with device 2 870 by generating a response signal corresponding to a call received from device 2 870 and transmitting the response signal to device 2 870 through transceiver 1 821.

Device 1 820 may receive the first signal from device 2 870 through transceiver 1 821. For example, the first signal may include not only a voice signal, a video signal, and a text signal, but also a combination signal of the above-mentioned signals. Device 1 820 may transmit the first signal, context awareness information, and the mutual information between the users of device 1 820 and device 2 870 to the server 850 through transceiver 2 827.

For example, the context awareness information may refer to overall information on the user of device 1 820. For example, the context awareness information may include a calendar schedule, a variety of information included in an email, an SMS, and a messenger, names and phone numbers of other users, personal information such as birthday, an ambient noise, weather, environment information such as traffic, information on a heart rate acquired through an HRM, which are included in a specific terminal. The context awareness information may be collected from a sensor 826 and may be stored in a storage device included in device 1 840 or a separate storage device connected with device 1 840, such as personal data 1 840.

In addition, the mutual information between the users of device 1 820 and device 2 870 may include information on a social distance between the users. For example, the user of device 1 820 and the user of device 2 870 may be friends or the user of device 2 870 may be the boss of the user of device 1 820.

For example, when connection between device 1 820 and device 2 870 is established, the task manager 830 may determine what relationship the user of device 2 870 has with the user of device 1 820, and may transmit a signal corresponding to the determination to the server 850 through transceiver 2 827.

The task manager 830 requests authentication from device 2 870 based on a relation level between the users of device 1 820 and device 2 870, and an authentication method, which are determined in the server, and, when the authentication is completed, may transmit an authentication completion signal to the server 850 through transceiver 2 827. The authentication may be performed to adjust the level of a response signal to be transmitted to device 2 870.

For example, transceiver 2 827 may receive information on the relation level and the authentication method from the server 850. The relation level is to classify the relationship between the user of device 1 820 and the user of device 2 870 According to an example based on a specific range. For example, the relation level may be determined as a user himself/herself level (first level), a family level (second level), a friend level (third level), a colleague level (fourth level), or other levels (fifth level).

The server 850 may determine to which relation level the user of device 2 870 belongs and transmit corresponding information to device 1 820. It may be determined to which relation level the user of device 2 870 belongs based on context awareness information such as a variety of information included in an email, an SMS, and a messenger, names and phone numbers of other users, and personal information such as birthday, as described above. For example, as the frequency of conversations made between the user of device 1 820 and the user of device 2 820 using a messenger is higher, the user of second device 2 870 may be determined to have a higher relation level.

The server 850 may determine the authentication method based on the determined relation level. For example, the authentication method may include a method in which the user of device 2 870 is required to input a pre-defined password, a method in which the user of device 2 870 is required to respond to a pre-defined question related to the user of device 1 820, and a method which recognizes the fingerprint or iris of the user of device 2 870. When the method of authenticating by responding to the pre-defined question is employed, the level of difficulty of the question is adjusted according to the relation level, such that an authentication method corresponding to the determined relation level can be selected. For example, as the relation level is higher, the user of device 2 870 may be authenticated through a question indicating a closer relationship with the user of device 1 820.

When the relation level of the user of device 2 870 and the corresponding authentication method are determined, the task manager 830 may request authentication from device 2 870. When the method of authenticating by responding to a pre-defined question is employed as in the above-described example, the task manager 830 may transmit a pre-defined question through transceiver 1 821. When device 2 870 transmits a correct response in response to the question, and transceiver 1 821 receives the response, the task manager 830 may determine that the authentication is completed and transmit an authentication completion signal to the server 850 through transceiver 2 827. To the contrary, when device 2 870 transmits an incorrect response and transceiver 1 821 receives the same, or when device 2 870 does not transmit any response, the task manager 830 may determine that the authentication is not completed and transmit an authentication incompletion signal to the server 850 through transceiver 2 827.

In the above-described example, the server 850 determines the relation level and the authentication method. However, according to an example, the task manager 830 included in device 1 820 may determine the relation level and the authentication method. In this case, the task manager 830 may determine the relation level and the authentication method according to the same procedure as the operation of determining the relation level and the authentication level by the server 850. In addition, the above-described authentication procedure may be omitted according to the intention of the first signal, which will be described later. For example, when the first signal includes a sensitive query related to the personal information of the user of device 1 820, as a result of understanding the intention of the first signal, the authentication procedure still proceeds, whereas, when the first signal includes a relatively general and less sensitive query, the above-described authentication procedure may be omitted.

Device 1 820 may receive data corresponding to the first signal from the server 850 through transceiver 2 827. The data may include a content responding to a specific query or request included in the first signal.

According to an example, the data may be generated by the server 850 which is connected with device 1 820. For example, the server 850 may determine the intention corresponding to the first signal and generate the data corresponding to the first signal based on the intention, the context awareness information, and the mutual information.

The intention corresponding to the first signal may be determined through a verbal expression or a non-verbal expression included in the first signal. For example, the intention corresponding to the first signal may be determined through NLP. For example, when the first signal is a voice signal, the server may convert the first signal into a text signal and then analyze the meaning of the signal. For example, the server may analyze the meaning of the text signal through morpheme analysis, syntax analysis, etc. In addition, the server may analyze whether the intention of the text signal is to ask a question, make a request, or simply express a feeling through speech act analysis, and may determine the intention of the first signal as a result of the analyzing.

According to another example, the NLP may be performed through the task manager 830, a Natural Language Understanding (NLU) module 824, and an Auto Speech Recognition (ASR) module 825. For example, when the first signal is a voice signal, the voice signal may be converted into a text signal through the ASR module 825, and the meaning of the text signal may be analyzed through the NLU module 824, and the intention of the first signal may be determined.

The intention corresponding to the first signal may be determined through a non-verbal expression. For example, when the first signal is a voice signal, the intention corresponding to the first signal may be determined through a non-verbal expression such as a speech rate, a tone, an intonation, a speech pattern, or stammer of a speaker, a sigh or cough given while the speaker is speaking, etc. In addition, when the first signal is a video signal, the intention corresponding to the first signal may be determined through a non-verbal expression such as a look or a complexion of the speaker.

The server 850 may generate data corresponding to the first signal based on the intention of the first signal understood as described above, the context awareness information, and the mutual information between the users of device 1 820 and device 2 870. For example, the data may be generated based on response information corresponding to the intention of the first signal. In this case, the response information may be predetermined and stored in the server 850 or stored in an external device connected with the server 850, or may be stored in device 1 820 as personal data 1 840 or stored in an external device connected with device 1 820. The server 850 may generate the data by selecting specific information included in the response information or may generate the data by combining a plurality of pieces of information included in the response information.

In addition, the server 850 may generate the data based on the mutual information. The mutual information may be received from device 1 820 and the server 850 may determine the mutual information according to the same operation as the operation of generating the mutual information by device 1 820 according to circumstances.

For example, when the user of device 2 870 is the boss of the user of device 1 820, device 1 820 may determine the relationship between the users to be a superordinate relationship with reference to the user of device 1 820, and, when the user of device 1 820 and the user of device 2 870 are friends, device 1 820 may determine the relationship between the users to be an equal relationship, and transmit information on the relationship to the server 850.

In the above-described example, when the server 850 receives the mutual information including the superordinate relationship information from device 1 820, the server 850 may consider the mutual information in generating the data. In other words, the server may consider the mutual information including the superordinate relationship information in selecting specific information included in the response information or combining the plurality of pieces of information included in the response information, and as a result, may generate the data by selecting or combining information indicating more polite and more formal expressions. Detailed exemplary embodiments thereof will be explained below FIG. 11.

According to another example, the data may be generated through the task manager 830, a Text-To-Speech (TTS) module 822, and a Natural Language Generator (NLG) module 823, which are included in device 1 820. In other words, the NLG module 823 may generate the data using the intention of the first signal understood as described above, and the mutual information which may be stored as personal data 1 840, and the data may be converted into voice data through the TTS module 822 according to circumstances.

In general, the form of the data may be determined to correspond to the form of the first signal. For example, when the first signal is a voice signal, the data may also be determined to be voice data. However, the form of the data is not necessarily determined to correspond to the first signal, and may be determined to be data of a different form according to circumstances.

The task manager 830 may generate the response signal based on the data received from the server, and device 1 820 may transmit the response signal to device 2 870 through transceiver 1 821, and then, finish connecting with device 2 870.

Figure 9:
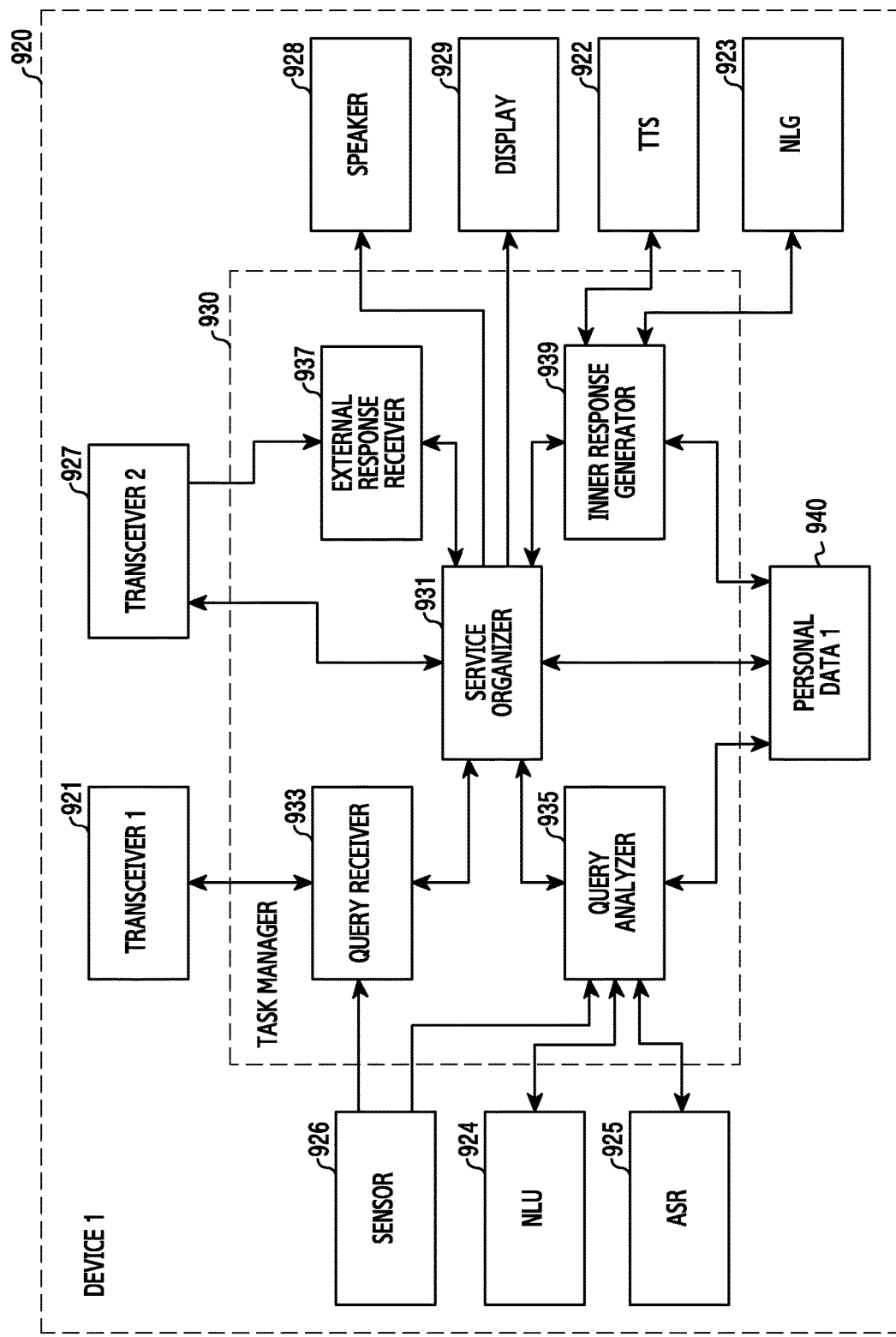
FIG. 9 is a block diagram illustrating an example first electronic device.

FIG. 9 is a block diagram illustrating an example first electronic device.

Referring to FIG. 9, device 1 920 may be referred to as a first electronic device, and may be included in a terminal in a wireless communication system. In addition, device 1 920 may include the entirety or part of the electronic device 101 shown in FIG. 1, and may include the entirety or part of the electronic device 200 shown in FIG. 2.

According to an example, a service organizer 931 may establish connection with device 2. Device 2 may be referred to as a second electronic device and may be included in a terminal in a wireless communication system.

A query receiver 933 may receive a first signal from device 2 through transceiver 1 921, and the service organizer 931 may transmit the first signal and mutual information between the users of device 1 920 and device 2 to a server through transceiver 2 927. An external response receiver 937 may receive a response signal corresponding to the first signal through transceiver 2 927, and transceiver 1 921 may transmit the response signal to device 2.

The query receiver 933 may receive the first signal from device 2 through transceiver 1 921. For example, the first signal may include not only a voice signal, a video signal, a text signal, but also a combination signal of the above-described signals. Device 1 920 may transmit the first signal, context awareness information, and mutual information between the users of device 1 920 and device 2 to the server through transceiver 2 927.

For example, the context awareness information may refer to overall information on the user of device 1 920. For example, the context awareness information may include a calendar schedule, a variety of information included in an email, an SMS, and a messenger, names and phone numbers of other users, personal information such as birthday, an ambient noise, weather, environment information such as traffic, information on a heart rate acquired through an HRM, which are included in a specific terminal. The context awareness information may be collected form a sensor 926, and may be stored in a storage device included in device 1 940 and in a separate storage device connected with device 1 940, as personal data 1 940.

In addition, the mutual information between the users of device 1 920 and device 2 may include information on a social distance between the users. For example, the user of device 1 920 and the user of device 2 may be friends or the user of device 2 may be the boss of the user of device 1 920.

For example, when connection between device 1 920 and device 2 is established, the service organizer 931 may determine what relationship the user of device 2 has with the user of first device 1 920, and may transmit a signal corresponding to the determination to the server through transceiver 2 927.

The service organizer 931 requests authentication from device 2 based on a relation level between the users of device 1 920 and device 2, and an authentication method, which are determined in the server, and, when the authentication is completed, may transmit an authentication completion signal to the server through transceiver 2 927. The authentication may be performed to adjust the level of a response signal to be transmitted to device 2.

For example, transceiver 2 927 may receive information on the relation level and the authentication method from the server. The relation level is to classify the relationship between the user of device 1 920 and the user of device 2 according to an exemplary embodiment according to a specific range. For example, the relation level may be determined as a user himself/herself level (first level), a family level (second level), a friend level (third level), a colleague level (fourth level), or other levels (fifth level).

The server may determine to which relation level the user of device 2 belongs and transmit corresponding information to device 1 920. For example, it may be determined to which relation level the user of device 2 belongs based on context awareness information such as a variety of information included in an email, an SMS, and a messenger, names and phone numbers of other users, and personal information such as birthday, as described above. For example, as the frequency of conversations made between the user of device 1 920 and the user of device 2 using a messenger is higher, the user of second device 2 may be determined to have a higher relation level.

The server may determine the authentication method according to the determined relation level. For example, the authentication method may include a method in which the user of device 2 is required to input a pre-defined password, a method in which the user of device 2 is required to respond to a pre-defined question related to the user of device 1, and a method which recognizes the fingerprint or iris of the user of device 2. For example, when the method of authenticating by responding to the pre-defined question is employed, the level of difficulty of the question is adjusted according to the relation level, such that an authentication method corresponding to the determined relation level can be selected. For example, as the relation level is higher, the user of device 2 may be authenticated through a question indicating a closer relationship with the user of device 1 920.

When the relation level of the user of device 2 and the corresponding authentication method are determined, the service organizer 931 may request authentication from device 2. When the method of authenticating by responding to a pre-defined question is employed as in the above-described example, the service organizer 931 may transmit a pre-defined question through transceiver 1 921. When device 2 transmits a correct response in response to the question, and transceiver 1 921 receives the response, the service organizer 931 may determine that the authentication is completed and transmit an authentication completion signal to the server 850 through transceiver 2 927. To the contrary, when device 2 transmits an incorrect response and transceiver 1 921 receives the same, or when device 2 does not transmit any response, the service organizer 931 may determine that the authentication is not completed and transmit an authentication incompletion signal to the server 850 through transceiver 2 927.

In the above-described example, the server determines the relation level and the authentication method. However, according to another example, the service organizer 931 included in device 1 920 may determine the relation level and the authentication method. In this case, the service organizer 931 may determine the relation level and the authentication method according to the same procedure as the operation of determining the relation level and the authentication method by the server. In addition, the above-described authentication procedure may be omitted according to the intention of the first signal, which will be described later. For example, when the first signal includes a sensitive query related to the personal information of the user of device 1 920, as a result of understanding the intention of the first signal, the authentication procedure still proceeds, whereas, when the first signal includes a relatively general and less sensitive query, the above-described authentication procedure may be omitted.

The external response receiver 937 may receive data corresponding to the first signal from the server 850 through transceiver 2 927. The data may include a signal responding to a specific query or request included in the first signal.

According to an example, the data may be generated by the server which is connected with device 1 920. In other words, the server may understood the intention corresponding to the first signal and generate the data corresponding to the first signal based on the intention and the mutual information.

The intention corresponding to the first signal may be determined through a verbal expression or a non-verbal expression included in the first signal. For example, the intention corresponding to the first signal may be determined through NLP. For example, when the first signal is a voice signal, the server may convert the first signal into a text signal and then analyze the meaning of the signal. Specifically, the server may analyze the meaning of the text signal through morpheme analysis, syntax analysis, etc. In addition, the server may analyze whether the intention of the text signal is to ask a question, make a request, or simply express a feeling through speech act analysis, and may determine the intention of the first signal as a result of the analyzing.

According to another example, the NLP may be performed through a query analyzer 935, an NLU module 924, and an ASR module 925. For example, when the first signal is a voice signal, the voice signal may be converted into a text signal through the ASR module 925, and the query analyzer 935 analyzes the meaning of the text signal through the NLU module 924, and understand the intention of the first signal.

The intention corresponding to the first signal may be determined through a non-verbal expression. For example, when the first signal is a voice signal, the intention corresponding to the first signal may be determined through a non-verbal expression such as a speech rate, a tone, an intonation, a speech pattern, or stammer of a speaker, a sigh or cough given while the speaker is speaking, etc. In addition, when the first signal is a video signal, the intention corresponding to the first signal may be determined through a non-verbal expression such as a look or a complexion of the speaker.

The server may generate data corresponding to the first signal based on the intention of the first signal understood as described above, and the mutual information between the users of device 1 920 and device 2. For example, the data may be generated based on response information corresponding to the intention of the first signal. In this case, the response information may be predetermined and stored in the server or an external device connected with the server, or may be stored in device 1 920 as personal data 1 940 or stored in an external device connected with device 1 920. The server may generate the data by selecting specific information included in the response information or may generate the data by combining a plurality of pieces of information included in the response information.

In addition, the server may generate the data based on the mutual information. The mutual information may be received from device 1 920 and the server may determine the mutual information according to the same operation as the operation of generating the mutual information by device 1 920 based on circumstances.

For example, when the user of device 2 is the boss of the user of device 1 920, device 1 920 may determine the relationship between the users to be a superordinate relationship with reference to the user of device 1 920, and, when the user of device 1 920 and the user of device 2 are friends, device 1 920 may determine the relationship between the users to be an equal relationship, and transmit information on the relationship to the server.

In the above-described example, when the server receives the mutual information including the superordinate relationship information from device 1 920, the server may consider the mutual information in generating the data. For example, the server may consider the mutual information including the superordinate relationship information in selecting specific information included in the response information or combining the plurality of pieces of information included in the response information, and as a result, may generate the data by selecting or combining information indicating more polite and more formal expressions. Detailed examples thereof will be explained below with reference to FIG. 11.

According to another example, a response signal corresponding to the first signal may be generated through an inner response generator 939, a TTS module 922, and an NLG module 923, which are included in device 1 920. For example, the inner response generator 929 may generate the response signal through the NLG module 923 using the intention of the first signal understood as described above and the mutual information stored as personal data 1 940, and the response signal may be converted into a voice signal through the TTS module 922 according to circumstances. In addition, the response signal may be outputted through a speaker 828 or may be outputted through a display 829 according to circumstances.

In general, the form of the response signal may be determined to correspond to the form of the first signal. For example, when the first signal is a voice signal, the response signal may also be determined to be a voice signal. However, the form of the response signal is not necessarily determined to correspond to the first signal, and may be determined to be a signal of a different form according to circumstances.

Device 1 920 transmits the response signal to device 2 through transceiver 1 921 and then finishes connecting with device 2.

Figure 10:
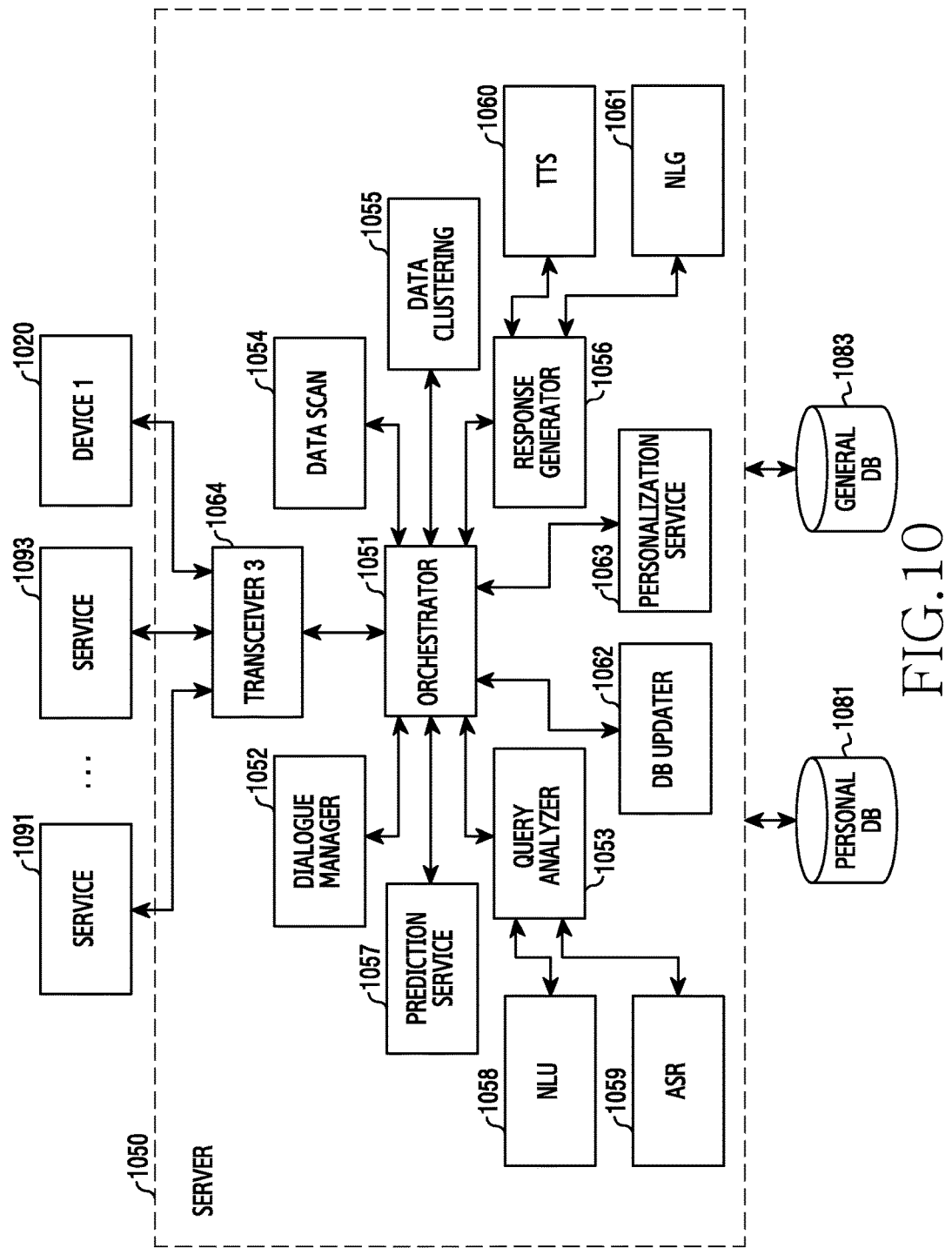
FIG. 10 is a block diagram illustrating an example network environment including a server.

FIG. 10 is a block diagram illustrating an example network environment including a server.

Referring to FIG. 10, the server 1050 may be connected with services 1091, 1093 and device 1 1020. Herein, the server 1050 may include the entirety or part of the server 106 shown in FIG. 1. In addition, device 1 1020 may include the entirety or part of the electronic device 101 shown in FIG. 1 and may include the entirety or part of the electronic device 200 shown in FIG. 2.

In addition, device 1 1020 may be included in a terminal in a wireless communication system, and the services 1091, 1093 refer to service providers which provide general information to the electronic device according to an exemplary embodiment. The server 1050 may scan and cluster data related to an external service through a data scan module 1054 and a data clustering module 1055. Information related to a specific electronic device connected with the server 1050 may be stored in a predetermined memory, for example, a volatile or non-volatile memory, as a personal DB 1081, through the server 1050. In addition, generalized information related to a plurality of electronic devices connected with the server 1050 may be stored in a predetermined memory, for example, a volatile or non-volatile memory, as a general DB 1083, through the server 1050. In addition, the personal DB 1081 and the general DB 1083 may be updated through a DB updater 1062.

According to an example, device 1 1020 may establish connection with device 2. Device 2 may be referred to as a second electronic device and may be included in a terminal in a wireless communication system.

An orchestrator 1051 included in the server 1050 may receive a first signal from device 1 1020 through transceiver 3 1064. The first signal may be a signal which is transmitted from device 2 to device 1 1020. For example, the first signal may include not only a voice signal, a video signal, and a text signal, but also a combination signal of the above-mentioned signals. In addition, the orchestrator 1051 may receive mutual information between the users of device 1 1020 and device 2 from device 1 1020 through transceiver 3 1064.

For example, the mutual information between the users of device 1 1020 and device 2 may include information on a social distance between the users. For example, the user of device 1 1020 and the user of device 2 may be friends or the user of device 2 may be the boss of the user of device 1 1020.

The orchestrator 1051 may determine a relation level and an authentication method. The relation level is to classify the relationship between the user of device 1 1020 and the user of device 2 according to an example may be based on a specific range. For example, the relation level may be determined as a user himself/herself level (first level), a family level (second level), a friend level (third level), a colleague level (fourth level), or other levels (fifth level).

The orchestrator 1051 may determine to which relation level the user of device 2 belongs and transmit corresponding information to device 1 1020 through transceiver 3 1064. For example, it may be determined to which relation level the user of device 2 belongs based on context awareness information such as a variety of information included in an email, an SMS, and a messenger, names and phone numbers of other users, and personal information such as birthday, as described above. For example, as the frequency of conversations made between the user of device 1 1020 and the user of device 2 using a messenger is higher, the user of second device 2 may be determined to have a higher relation level.

The orchestrator 1051 may determine the authentication method according to the determined relation level. For example, the authentication method may include a method in which the user of device 2 is required to input a pre-defined password, a method in which the user of device 2 is required to respond to a pre-defined question related to the user of device 1 1020, and a method which recognizes the fingerprint or iris of the user of device 2. For example, when the method of authenticating by responding to the pre-defined question is employed, the level of difficulty of the question is adjusted according to the relation level, such that an authentication method corresponding to the determined relation level can be selected. For example, as the relation level is higher, the user of device 2 may be authenticated through a question indicating a closer relationship with the user of device 1 1020.

When the relation level of the user of device 2 and the corresponding authentication method are determined, device 1 1020 may request authentication from device 2. Thereafter, the orchestrator 1051 may receive an authentication completion signal or an authentication incompletion signal from device 1 1020 through transceiver 3 1064 according to whether device 2 is authenticated or not. In addition, the above-described authentication procedure may be omitted according to the intention of the first signal, which will be described later. For example, when the first signal includes a sensitive query related to the personal information of the user of device 1 1020, as a result of understanding the intention of the first signal, the authentication procedure still proceeds, whereas, when the first signal includes a relatively general and less sensitive query, the above-described authentication procedure may be omitted.

The server 1050 may generate data corresponding to the first signal. In other words, the server 1050 may understand the intention corresponding to the first signal and generate the data corresponding to the first signal based on the intention and the mutual information.

The intention corresponding to the first signal may be determined through a verbal expression or a non-verbal expression included in the first signal. For example, the intention corresponding to the first signal may be determined through NLP. The NLP may be performed through a query analyzer 1053, a dialogue manager 1052, an NLU module 1058, and an ASR module 1059. In other words, when the first signal is a voice signal, the voice signal may be converted into a text signal through the ASR module 1059, and the query analyzer 1053 may analyze the meaning of the text signal through the NLU module 1024, and understand the intention of the first signal. For example, the meaning of the text signal may be analyzed through morpheme analysis, syntax analysis, etc., and the intention may be understood by analyzing whether the intention of the text signal is to ask a question, make a request, or simply express a feeling.

According to another example, the intention corresponding to the first signal may be determined through a non-verbal expression. For example, when the first signal is a voice signal, the intention corresponding to the first signal may be determined through a non-verbal expression such as a speech rate, a tone, an intonation, a speech pattern, or stammer of a speaker, a sigh or cough given while the speaker is speaking, etc. In addition, when the first signal is a video signal, the intention corresponding to the first signal may be determined through a non-verbal expression such as a look or a complexion of the speaker.

A response generator 1056 may generate data corresponding to the first signal based on the intention of the first signal understood as described above, and the mutual information between the users of device 1 1020 and device 2. For example, the data may be generated based on response information corresponding to the intention of the first signal. In this case, the response information may be predetermined and stored in the server 1050 or an external device connected with the server 1050, or may be stored in device 1 1020 as personal data 1 1040 or stored in an external device connected with device 1 1020. The server 1050 may generate the data by selecting specific information included in the response information or may generate the data by combining a plurality of pieces of information included in the response information.

In addition, the response generator 1056 may generate the data based on the mutual information. The mutual information may be received from device 1 1020, and the orchestrator 1050 may determine the mutual information according to the same operation as the operation of generating the mutual information by device 1 1020 based on circumstances.

For example, when the user of device 2 is the boss of the user of device 1 1020, device 1 1020 may determine the relationship between the users to be a superordinate relationship with reference to the user of device 1 1020, and, when the user of device 1 1020 and the user of device 2 are friends, device 1 1020 may determine the relationship between the users to be an equal relationship, and transmit information on the relationship to the server 1050.

In the above-described example, when the server 1050 receives the mutual information including the superordinate relationship information from device 1 1020, the response generator 1056 may consider the mutual information in generating the data. For example, the response generator 1056 may consider the mutual information including the superordinate relationship information in selecting specific information included in the response information or combining the plurality of pieces of information included in the response information, and as a result, may generate the data by selecting or combining information indicating more polite and more formal expressions. Detailed examples thereof will be explained below with reference to FIG. 11.

For example, the response generator 1056 may generate the data through a TTS module 1022, an NLG module 1023, and a personalization service 1063. In other words, the response generator 1056 may generate the data through the NLG module 923 using the intention of the first signal understood as described above and the mutual information stored as personal data 1 1040, and may convert the data into a voice signal through the TTS module 1022 based on circumstances. For example, a content which is not requested in the first signal may be predicted through a prediction service 1057 when the data is generated.

Figure 11:
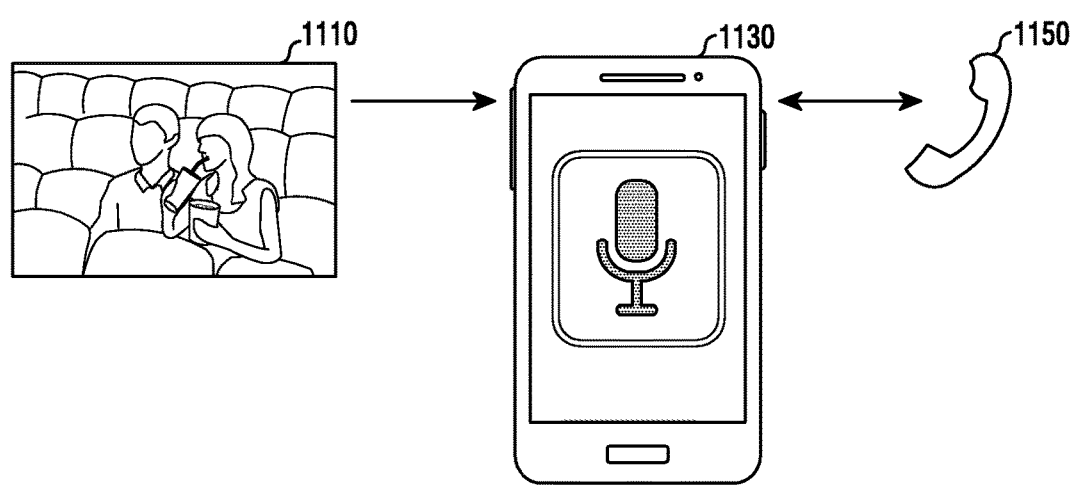
FIG. 11 is a view illustrating an example operation scenario of a first electronic device and a second electronic device

FIG. 11 is a view illustrating an example operation scenario of a first electronic device and a second electronic device.

Referring to FIG. 11, a terminal 1130 according to an example may include a first electronic device, and the first electronic device may be referred to as a personal assistant device. In addition, a second electronic device 1150 according to an example may communicate with the terminal 1130 wirelessly, and the second electronic device may be included in a terminal other than the terminal 1130. In addition, the user of the terminal 1130 may be watching a movie as indicated by reference numeral 1110, and may operate the first electronic device while watching the movie. For example, the user may pre-set a current condition, "watching a movie," in advance and may operate the first electronic device. Based on circumstances, the first electronic device may determine the current condition, "watching a movie," by itself based on external environment information which is obtained through location, sensor information, sound, etc., and internal information which is stored in the terminal 1130, such as a schedule, an SMS including payment details, an email, etc.

When a call is received from the second electronic device 1150, the terminal 1130 may establish connection with the second electronic device 1150, and may transmit, to the second electronic device 1150, a specific response, for example, a voice signal or a text signal including a content saying "Sony, I can't talk because I'm watching a movie," according to the operation of the first electronic device.

When the second electronic device transmits a first signal including a query like "When will it end?" to the first electronic device, the first electronic device may transmit the first signal and mutual information between the users of the first electronic device and the second electronic device to a server. The server may analyze the intention of the first signal and generates data corresponding to the first signal using the mutual information, and then transmits the data to the first electronic device. For example, the data may be voice data including a content saying "It will be over in about one hour.", and the first electronic device may transmit a response signal corresponding to the data to the second electronic device.

The first electronic device may go through an authentication procedure prior to transmitting the data to the second electronic device. For example, the authentication procedure may be performed based on a relation level between the user of the first electronic device and the user of the second electronic device, and an authentication method corresponding to the relation level. For example, when the first signal is received from an unknown sender, the first electronic device may determine the relation level of the sender as "other levels," which is the lowest level, and may proceed with the authentication procedure through an authentication question like "Do you know the nickname of KIM, o o (the user of the first electronic device)?", which correspond to the other levels. In addition, when the first electronic device determines that the query or request included in the first signal is urgent as a result of understanding the intention of the first signal, the authentication procedure may be omitted.

Thereafter, the second electronic device may transmit a second signal including a content saying "Please call me after the movie is over!" to the first electronic device, and the first electronic device may receive data corresponding to the second signal, "Yes," from the server, and transmit a response signal corresponding to the data to the second electronic device according to the same procedure as the above-described procedure.

The first electronic device may register the schedule indicating that the user of the second electronic device requires a callback after the movie is over in a storage device which is included in the first electronic device or exists separately.

Figure 12:
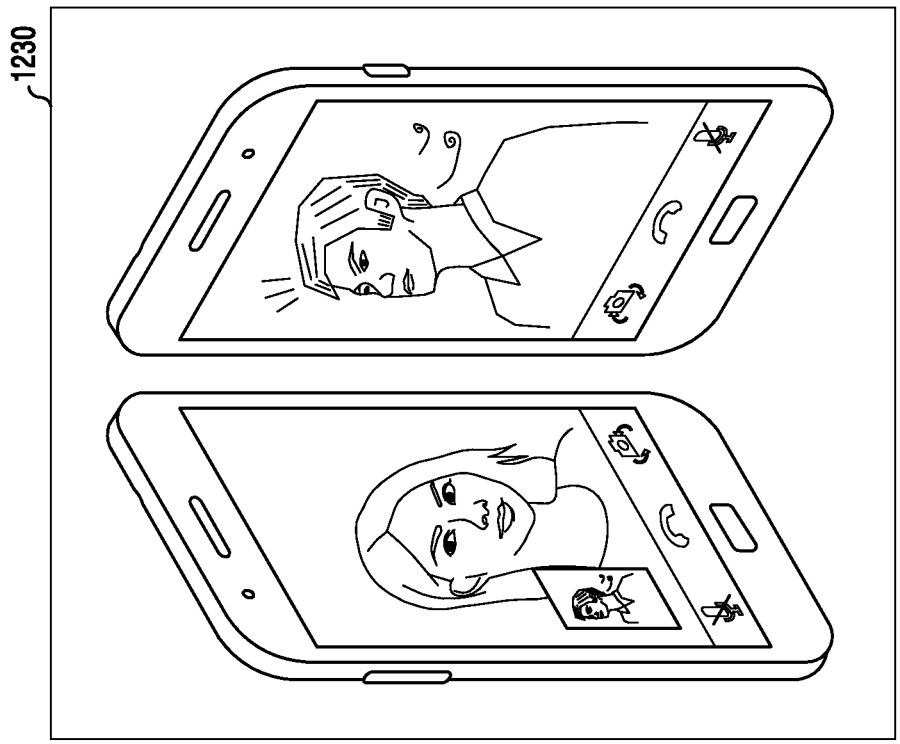
FIG. 12 is a view illustrating an example operation scenario of a first electronic device and a second electronic device.
Figure 12:
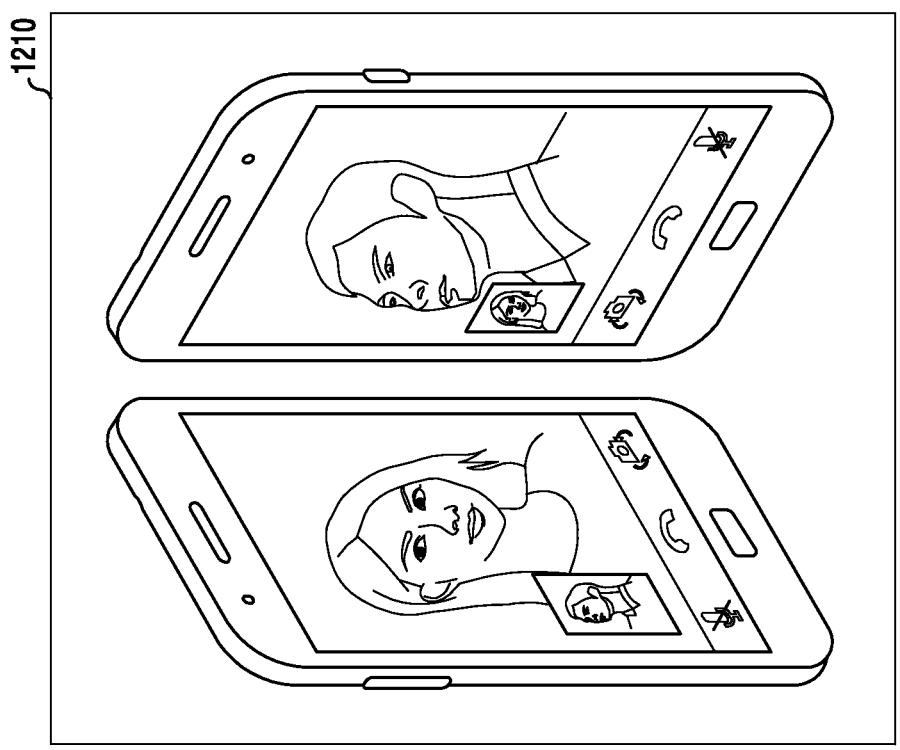

FIG. 12 is a view illustrating an example operation scenario of a first electronic device and a second electronic device.

Referring to FIG. 12, a terminal illustrated on the left out of terminals illustrated in left view 1210 may include a second electronic device according to an example, and the other terminal illustrated on the right may include a first electronic device according to an example. Likewise, a terminal illustrated on the left out of terminals illustrated in right view 1230 may include a second electronic device, and the other terminal illustrated on the right may include a first electronic device.

View 1210 illustrates that the users of both terminals are making a video call. For example, the user of the left terminal may request a video call to the user of the right terminal, and the user of the right terminal makes a video call with the user of the left terminal in response to this request.

View 1230 illustrates how the first electronic device included in the right terminal operates when the user of the left terminal requests a video call. The first electronic device may store, in the first electronic device or the server, a pattern that the user of the first electronic device usually has when making a video call, a user's usual face or gesture, a user's face or gesture when making a call, information related to a video call image, a voice signal, etc., and may generate an avatar corresponding to the user, and, in response to a video call request from the user of the left terminal, have a video call between both users by displaying the avatar on the right terminal.

Figure 13:
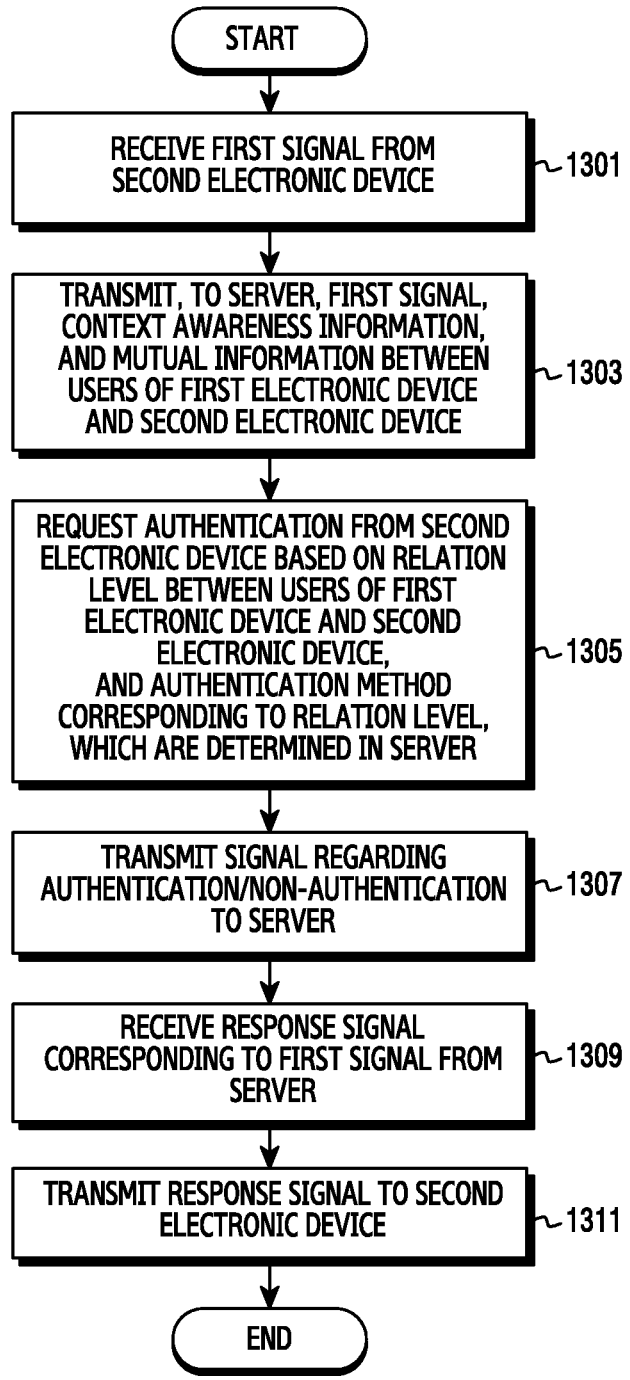
FIG. 13 is a flowchart illustrating an example method of operation of a first electronic device.

FIG. 13 is a flowchart illustrating an example method of operation of a first electronic device.

Referring to FIG. 13, in operation 1301, the first electronic device may receive a first signal from the second electronic device. For example, the first signal may include not only a voice signal, a video signal, and a text signal, but also a combination signal of the above-mentioned signals.

In operation 1303, the first electronic device may transmit the first signal, context awareness information, and mutual information between the users of the first electronic device and the second electronic device to the server.

The context awareness information may refer to overall information on the user of the first electronic device. For example, the context awareness information may include a calendar schedule, a variety of information included in an email, an SMS, and a messenger, names and phone numbers of other users, personal information such as birthday, an ambient noise, weather, environment information such as traffic, information on a heart rate acquired through an HRM, which are included in a specific terminal.

In addition, the mutual information between the users of the first electronic device and the second electronic device may include information on a social distance between the users. For example, the user of the first electronic device and the user of the second electronic device may be friends or the user of the second electronic device may be the boss of the user of the first electronic device.

In operation 1305, the first electronic device may request authentication from the second electronic device based on a relation level between the users of the first electronic device and the second electronic device and an authentication method corresponding to the relation level, which are determined in the server. The relation level is to classify the relationship between the user of the first electronic device and the user of the second electronic device according to an example is based on a specific range. For example, the relation level may be determined as a user himself/herself level (first level), a family level (second level), a friend level (third level), a colleague level (fourth level), or other levels (fifth level). In addition, the authentication method corresponding to the relation level may include a method in which the user of the second electronic device is required to input a pre-defined password, a method in which the user of the second electronic device is required to respond to a pre-defined question related to the user of the first electronic device, and a method which recognizes the fingerprint or an iris of the user of the second electronic device.

In operation 1307, the first electronic device may transmit a signal regarding whether the second electronic device is authenticated or not to the server. For example, the signal regarding whether the second electronic device is authenticated or not may include an authentication completion signal or an authentication incompletion signal according to whether the second electronic device is authenticated or not.

In operation 1309, the first electronic device may receive a response signal corresponding to the first signal from the server. The server may analyze the intention of the first signal. The intention may be determined through a verbal expression or a non-verbal expression included in the first signal. In addition, the server may generate the response signal corresponding to the first signal based on the analyzed intention of the first signal and the mutual information between the users of the first electronic device and the second electronic device, and the first electronic device may receive the response signal from the server.

In operation 1311, the first electronic device may transmit the response signal to the second electronic device, and, as a result, the connection between the first electronic device and the second electronic device may be finished.

According to various examples, the respective operations in FIG. 13 (operations 1301, 1303, 1305, 1307, 1309, and 1311) may be performed in sequence, but this should not be considered as limiting. Some of the operations may be omitted or the order of some operations may be changed.

Figure 14:
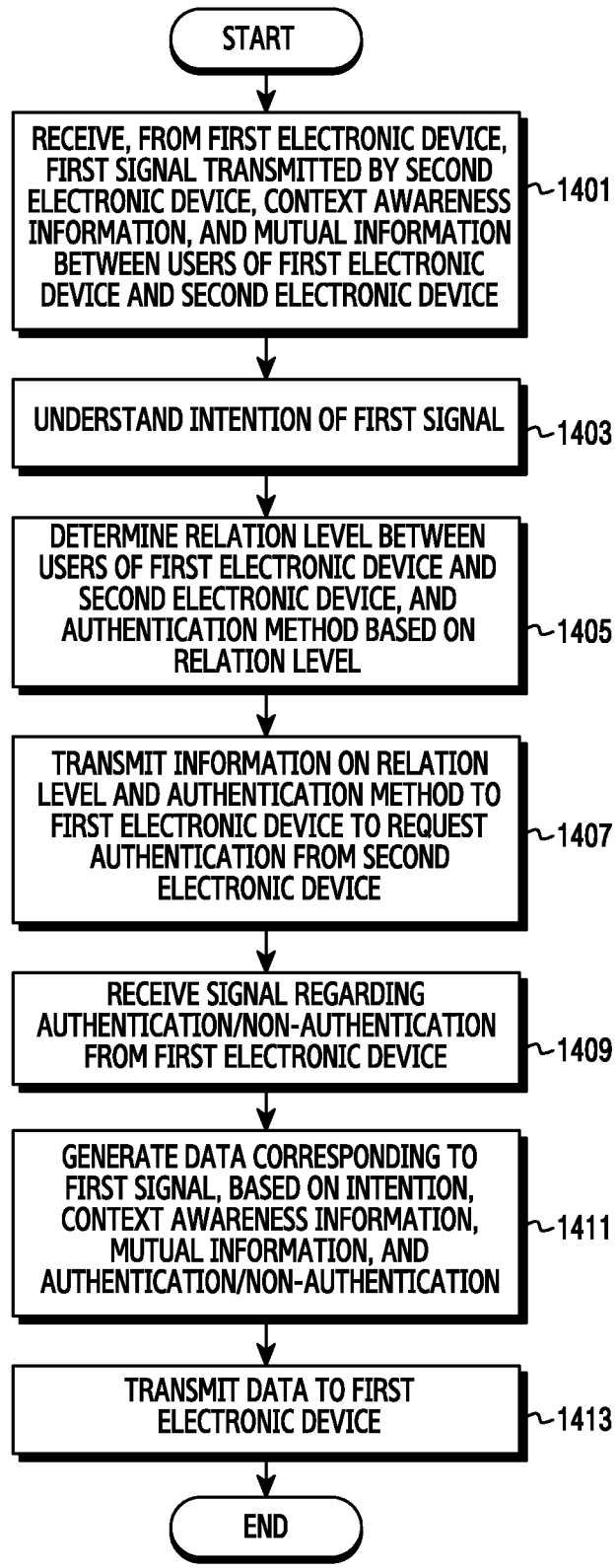
FIG. 14 is a flowchart illustrating an example method of operation of a server.

FIG. 14 is a flowchart illustrating an example method of operation of a server.

Referring to FIG. 14, in operation S1401, the server may receive, from the first electronic device, a first signal transmitted by the second electronic device, context awareness information, and mutual information between the users of the first electronic device and the second electronic device. For example, the first signal may include not only a voice signal, a video signal, and a text signal, but also a combination signal of the above-mentioned signals, and the context awareness information may include a calendar schedule, a variety of information included in an email, an SMS, and a messenger, names and phone numbers of other users, personal information such as birthday, an ambient noise, weather, environment information such as traffic, information on a heart rate acquired through an HRM, which are included in a specific terminal.

In addition, the context awareness information may refer to overall information on the user of the first electronic device. For example, the context awareness information may include a calendar schedule, a variety of information included in an email, an SMS, and a messenger, names and phone numbers of other users, personal information such as birthday, an ambient noise, weather, environment information such as traffic, information on a heart rate acquired through an HRM, which are included in a specific terminal.

In operation S1403, the server may understand an intention corresponding to the first signal. For example, the intention may be determined through a verbal expression or a non-verbal expression included in the first signal. For example, the intention may be determined through Natural Language Processing (NLP), and, when the first signal is a voice signal, the non-verbal expression may include a speech rate, a tone, an intonation, a speech pattern, or stammer of a speaker, a sigh or cough given while the speaker is speaking, etc.

In operation S1405, the server may determine a relation level between the users of the first electronic device and the second electronic device, and an authentication method based on the relation level. The relation level is to classify the relationship between the user of the first electronic device and the user of the second electronic device according to an example and is based on a specific range. For example, the relation level may be determined as a user himself/herself level (first level), a family level (second level), a friend level (third level), a colleague level (fourth level), or other levels (fifth level). In addition, the authentication method corresponding to the relation level may include a method in which the user of the second electronic device is required to input a pre-defined password, a method in which the user of the second electronic device is required to respond to a pre-defined question related to the user of the first electronic device, and a method which recognizes the fingerprint or iris of the user of the second electronic device.

In operation S1407, the server may transmit information on the relation level and the authentication method to the first electronic device in order to request authentication from the second electronic device. Through this operation, the first electronic device may request authentication from the second electronic device.

In operation 1409, the server may receive a signal regarding whether the second electronic device is authenticated or not from the first electronic device. For example, the signal regarding whether the second electronic device is authenticated or not may include an authentication completion signal or an authentication incompletion signal according to whether the second electronic device is authenticated or not.

In operation 1411, the server may generate data corresponding to the first signal based on the intention, the context awareness information, the mutual information, and information on whether the second electronic device is authenticated or not. The intention may be determined through a verbal expression or a non-verbal expression included in the first signal. In addition, the server may generate the data corresponding to the first signal based on the analyzed intention of the first signal and the mutual information between the users of the first electronic device and the second electronic device.

In operation 1413, the server may transmit the data to the first electronic device. As a result, the first electronic device may transmit a response signal to the second electronic device.

According to various examples, the respective operations in FIG. 14 (operations 1401, 1403, 1405, 1407, 1409, 1411, and 1413) may be performed in sequence, but this should not be considered as limiting. Some of the operations may be omitted or the order of some operations may be changed.

Figure 15:
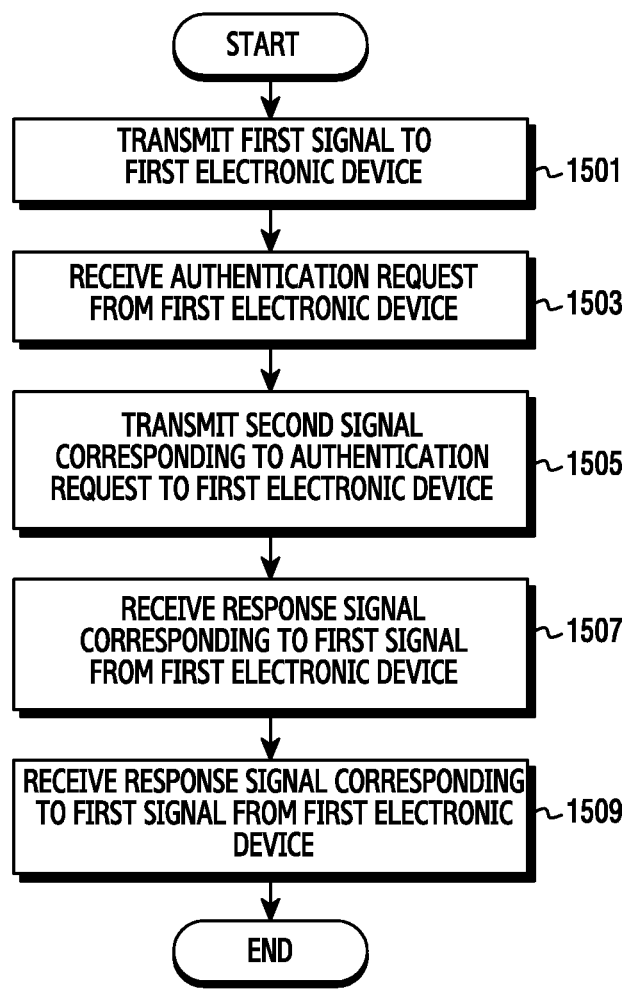
FIG. 15 is a flowchart illustrating an example method of operation of a second electronic device.

FIG. 15 is a flowchart illustrating an example method of operation of a second electronic device.

Referring to FIG. 15, in operation 1501, the second electronic device may transmit a first signal to the first electronic device. For example, the first signal may include not only a voice signal, a video signal, and a text signal, but also a combination signal of the above-mentioned signals.

In operation 1503, the second electronic device may receive an authentication request from the first electronic device. The authentication request may be made based on a relation level between the users of the first electronic device and the second electronic device, and an authentication method corresponding to the relation level. In this case, the relation level is to classify the relationship between the user of the first electronic device and the user of the second electronic device according to an example is based on a specific range. For example, the relation level may be determined as a user himself/herself level (first level), a family level (second level), a friend level (third level), a colleague level (fourth level), or other levels (fifth level). In addition, the authentication method corresponding to the relation level may include a method in which the user of the second electronic device is required to input a pre-defined password, a method in which the user of the second electronic device is required to respond to a pre-defined question related to the user of the first electronic device, and a method which recognizes the fingerprint or iris of the user of the second electronic device.

In operation 1505, the second electronic device may transmit a second signal corresponding to the authentication request to the first electronic device. For example, the second signal may be a specific response according to the authentication method, or may be a non-response based on circumstances.

In operation 1507, the second electronic device may receive a response signal corresponding to the first signal from the first electronic device. For example, the response signal may be generated based on the intention of the first signal and the mutual information between the users of the first electronic device and the second electronic device.

According to various examples, the respective operations in FIG. 15 (operations 1501, 1503, 1505, 1507, and 1509) may be performed in sequence, but this should not be considered as limiting. Some of the operations may be omitted or the order of some operations may be changed.

Figure 16:
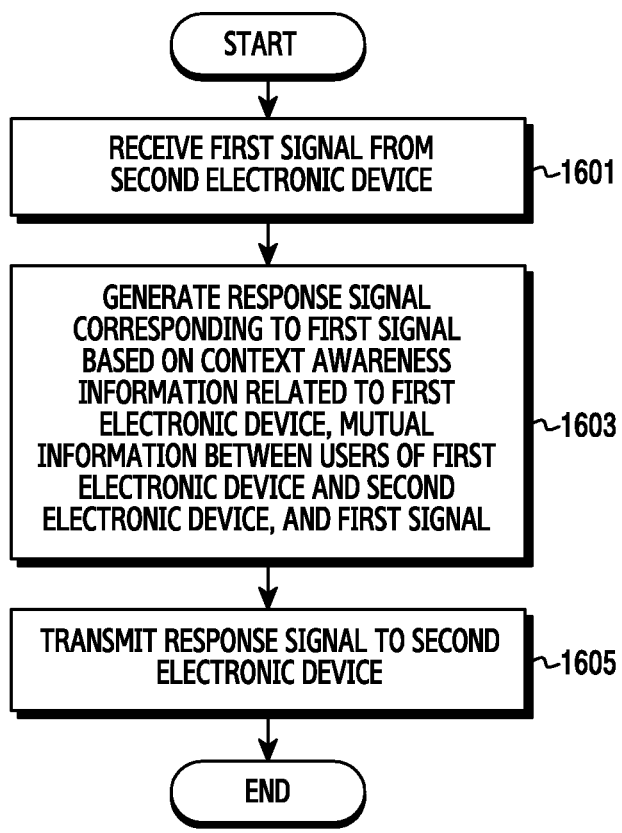
FIG. 16 is a flowchart illustrating an example method of operation of a first electronic device.

FIG. 16 is a flowchart illustrating an example method of operation of a first electronic device.

Referring to FIG. 16, in operation 1601, the first electronic device may receive a first signal from the second electronic device. For example, the first signal may include not only a voice signal, a video signal, and a text signal, but also a combination signal of the above-mentioned signals.

In operation 1603, the first electronic device may generate a response signal corresponding to the first signal based on context awareness information related to the first electronic device, mutual information between the users of the first electronic device and the second electronic device, and the first signal.

The context awareness information may refer to overall information on the user of the first electronic device. For example, the context awareness information may include a calendar schedule, a variety of information included in an email, an SMS, and a messenger, names and phone numbers of other users, personal information such as birthday, an ambient noise, weather, environment information such as traffic, information on a heart rate acquired through an HRM, which are included in a specific terminal.

In addition, the mutual information may include information on a social distance between the users. For example, the user of the first electronic device and the user of the second electronic device may be friends or the user of the second electronic device may be the boss of the user of the first electronic device.

In operation 1605, the first electronic device may transmit the response signal to the second electronic device. For example, the response signal may be generated based on the intention of the first signal which is analyzed through a verbal expression or a non-verbal expression included in the first signal, and the mutual information.

Figure 17:
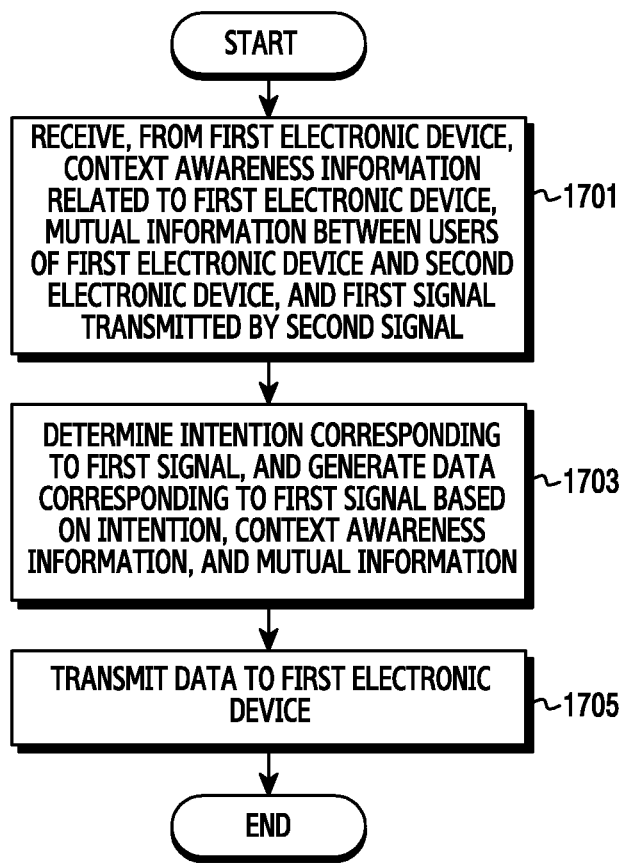
FIG. 17 is a flowchart illustrating an example method of operation of a server according to an exemplary embodiment.

FIG. 17 is a flowchart illustrating an example method of operation of a server.

Referring to FIG. 17, in operation 1701, the server may receive, from the first electronic device, context awareness information related to the first electronic device, mutual information between the users of the first electronic device and the second electronic device, and a first signal transmitted by the second electronic device. For example, the first signal may include not only a voice signal, a video signal, and a text signal, but also a combination signal of the above-mentioned signals. The context awareness information may refer to overall information on the user of the first electronic device. For example, the context awareness information may include a calendar schedule, a variety of information included in an email, an SMS, and a messenger, names and phone numbers of other users, personal information such as birthday, an ambient noise, weather, environment information such as traffic, information on a heart rate acquired through an HRM, which are included in a specific terminal.

In operation 1703, the server may determine an intention corresponding to the first signal, and generate data corresponding to the first signal based on the intention, the context awareness information, and the mutual information. For example, the intention may be determined through a verbal expression or a non-verbal expression included in the first signal. For example, the intention may be determined through Natural Language Processing (NLP). When the first signal is a voice signal, the non-verbal expression may include a speech rate, a tone, an intonation, a speech pattern, or stammer of a speaker, a sigh or cough given while the speaker is speaking, etc.

In operation 1705, the server may transmit the data to the first electronic device.

Figure 18:
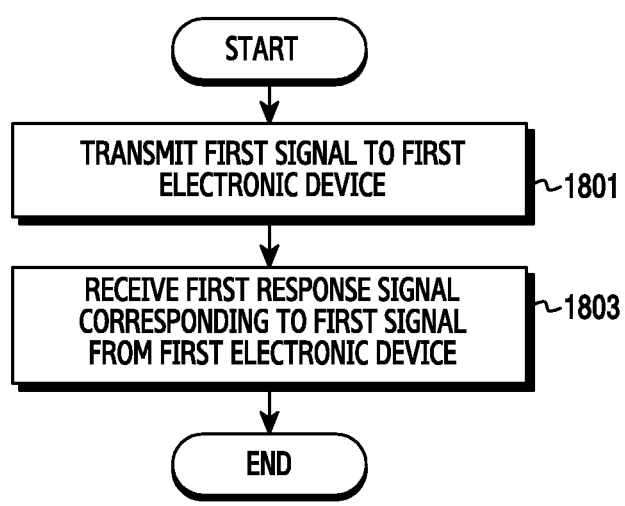
FIG. 18 is a flowchart illustrating an example method of operation of a second electronic device.

FIG. 18 is a flowchart illustrating an example method of operation of a second electronic device.

Referring to FIG. 18, in operation 1801, the second electronic device may transmit a first signal to the first electronic device. For example, the first signal may include not only a voice signal, a video signal, and a text signal, but also a combination signal of the above-mentioned signals.

In operation 1803, the second electronic device may receive a response signal corresponding to the first signal from the first electronic device. For example, the response signal may be generated based on the intention of the first signal and the mutual information between the users of the first electronic device and the second electronic device.

While examples have been shown and described with reference to certain non-limiting example embodiments thereof, it will be understood by those skilled in the art that various changes in form and details may be made therein without departing from the spirit and scope of the disclosure as defined by the appended claims. Therefore, the scope of the disclosure is defined not by the detailed description but by the appended claims, and all differences within the scope will be construed as being included in the disclosure.

What is claimed is:

1. An electronic device comprising:
one or more memories storing instructions;
a communication interface; and
one or more processors, coupled to the one or more memories and the communication interface, configured to execute the stored instructions to:
receive a signal from another electronic device;
in response to receiving the signal, determine mutual information between a first user of the electronic device and a second user of the another electronic device based on data regarding one or more previous conversations between the first user of the electronic device and the second user of the another electronic device;
identify an authentication method based on the mutual information;

in response to identifying the authentication method, transmit information regarding the authentication method to the another electronic device;
receive, from the another electronic device, authentication information generated based on the authentication method; and
transmit, based on the received the authentication information, a response signal responding to the signal.

2. The electronic device of claim 1, wherein the one or more processors are configured to execute the stored instructions to identify, among a plurality of authentication methods, the authentication method based on the mutual information, and
wherein the plurality of authentication methods comprise at least one of a method authenticating the second user through a fingerprint, a method authenticating the second user through an iris, a method authenticating the second user through a password, a method authenticating the second user through a response of predetermined question, and/or a method authenticating the second user through an input of a designated pattern.

3. The electronic device of claim 1, wherein the signal is received for requesting user related information to the electronic device, and
wherein the information regarding the authentication method is transmitted for identifying whether the second user is an allowed user.

4. The electronic device of claim 1, wherein the data regarding one or more previous communication events comprises a number of communication with the another electronic device or social distance between the first user and the second user.

5. The electronic device of claim 1, wherein, the response signal is generated based on an intention of the second user, wherein the intention of the second user is identified based on a verbal expression or a non-verbal expression obtained from the received signal.

6. The electronic device of claim 5, wherein the non-verbal expression comprises at least one of speech rate, a tone, an intonation, a speech pattern, and/or a stammer of the second user, and/or a sigh or a cough given while the second user is speaking.

7. An electronic device comprising:
one or more memories storing instructions;
a communication interface; and
one or more processors, coupled to the one or more memories and the communication interface, configured to execute the stored instructions to:
receive a signal from another electronic device;
in response to receiving the signal, determine mutual information between a first user of the electronic device and a second user of the another electronic device based on data regarding one or more previous conversations between the first user of the electronic device and the second user of the another electronic device;
transmit, to a server, a signal comprising information regarding the received signal from the another electronic device and the mutual information;
receive an authentication method based on the mutual information from the server;
in response to the receiving, transmit information regarding the authentication method to the another electronic device;
receive, from the another electronic device, authentication information generated based on the authentication method;
transmit the authentication information to the server;

receive, from the server, data to be included in a response, the data determined based on the information regarding the signal, the mutual information, and the authentication information; and transmit a response signal comprising the data to the another electronic device.

8. The electronic device of claim 7, wherein the authentication method, by the server, is identified among a plurality of authentication methods, based on the mutual information, and wherein the plurality of authentication methods comprises at least one of a method authenticating the second user through a fingerprint, a method authenticating the second user through an iris, a method authenticating the second user through a password, a method authenticating the second user through a response of a predetermined question and/or a method authenticating the second user through an input of a designated pattern.

9. The electronic device of claim 7, wherein the signal is received for requesting user related information to the electronic device, and wherein the information regarding the authentication method is transmitted for identifying whether the second user is an allowed user.

10. The electronic device of claim 7, wherein the data regarding one or more previous communication events comprises a number of communication(s) with the another electronic device or social distance between the first user and the second user.

11. The electronic device of claim 7, wherein the response signal an intention of the second user, wherein the intention of the second user is identified based on a verbal expression or a non-verbal expression obtained from the received signal.

12. The electronic device of claim 11, wherein the non-verbal expression comprises at least one of speech rate, a tone, an intonation, a speech pattern, a stammer of the second user, and/or a sigh or a cough given while the second user is speaking.

13. A server comprising:
one or more memories storing instructions;
a communication interface; and
one or more processors, coupled to the one or more memories and the communication interface, configured to execute the stored instructions to:
receive, from a first device, a first signal comprising information regarding a signal transmitted from a second device to the first device and mutual information between a first user of the first device and a second user of the second device based on data regarding one or more previous communications between the first user of the first device and the second user of the second device;

in response to the receiving, identify an authentication method based on the mutual information;

in response to the authentication method identified, transmit information on the authentication method to the first device;

receive, from the first device, authentication information generated based on the authentication method by the second device;

determine response data based on the first signal comprising information regarding a second signal and the mutual information; and transmit, to the first device, data to be included in the determined response data.

14. The server of claim 13, wherein the one or more processor(s) is/are configured to execute the stored instructions to identify, among a plurality of authentication methods, the authentication method based on the mutual information, and wherein the plurality of authentication methods comprises at least one of a method authenticating the second user through a fingerprint, a method authenticating the second user through a iris, a method authenticating the second user through a password, a method authenticating the second user through a response to a predetermined question, and/or a method authenticating the second user through an input of a designated pattern.

15. The server of claim 13, wherein the signal transmitted from a second device is for requesting user related information to the first device, and wherein the information regarding the authentication method is transmitted for identifying whether the second user is an allowed user.

16. The server of claim 13, wherein the data regarding one or more previous communication events comprises a number of communication(s) between the first device and the second device or social distance between the first user and the second user.

17. The server of claim 13, wherein the response is generated based on an intention of the second user, where the intention of the second user is identified based on a verbal expression or a non-verbal expression obtained from the received signal.

* * * * *